US 8,488,228 B2
Jul. 16, 2013

(12) United States Patent
Mienko et al.

(54) INTERFEROMETRIC DISPLAY WITH INTERFEROMETRIC REFLECTOR

(75) Inventors: Marek Mienko, San Jose, CA (US); Jonathan Charles Griffiths, Fremont, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 617 days.

(21) Appl. No.: 12/568,472

(22) Filed: Sep. 28, 2009

(65) Prior Publication Data

US 2011/0075241 A1    Mar. 31, 2011

(51) Int. Cl.
*G02F 1/03*    (2006.01)

(52) U.S. Cl.
USPC ........................................... 359/263

(58) Field of Classification Search
USPC ................... 359/263, 290, 291, 245
See application file for complete search history.

(56) References Cited

U.S. PATENT DOCUMENTS

| | | |
|---|---|---|
| 1,877,512 A | 9/1932 | Hurley |
| 2,590,906 A | 4/1952 | Tripp |
| 2,677,714 A | 5/1954 | Auwarter |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,859,060 A | 8/1989 | Katagiri et al. |
| 4,925,259 A | 5/1990 | Emmett |
| 4,954,789 A | 9/1990 | Sampsell |

(Continued)

FOREIGN PATENT DOCUMENTS

| | | |
|---|---|---|
| DE | 10 2006 039 071 | 2/2008 |
| EP | 0 035 299 | 9/1983 |

(Continued)

OTHER PUBLICATIONS

Londergan et al., Advanced processes for MEMS-based displays, Proceedings of the Asia Display 2007, SID, 1:107-112.

(Continued)

*Primary Examiner* — James Jones
(74) *Attorney, Agent, or Firm* — Knobbe, Martens, Olson & Bear LLP

(57) ABSTRACT

Interferometric modulators and methods of making the same are disclosed. In one embodiment, an interferometric modulator includes an interferometric reflector having a first reflective surface, a second reflective surface, and an optical resonant layer defined by the first reflective surface and the second reflective surface. The interferometric reflector can be configured to transmit a certain spectrum of light at a transmission peak wavelength such that the interferometric modulator has a diminished reflectance of light at the transmission peak wavelength.

41 Claims, 15 Drawing Sheets

U.S. PATENT DOCUMENTS

| | | | |
|---|---|---|---|
| 4,956,619 A | 9/1990 | Hornbeck | |
| 4,973,131 A | 11/1990 | Carnes | |
| 4,982,184 A | 1/1991 | Kirkwood | |
| 5,022,745 A | 6/1991 | Zahowski et al. | |
| 5,028,939 A | 7/1991 | Hornbeck et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,381,232 A | 1/1995 | Van Wijk | |
| 5,452,138 A | 9/1995 | Mignardi et al. | |
| 5,471,341 A | 11/1995 | Warde et al. | |
| 5,526,172 A | 6/1996 | Kanack | |
| 5,550,373 A | 8/1996 | Cole et al. | |
| 5,559,358 A | 9/1996 | Burns et al. | |
| 5,561,523 A | 10/1996 | Blomberg et al. | |
| 5,597,736 A | 1/1997 | Sampsell | |
| 5,600,383 A | 2/1997 | Hornbeck | |
| 5,636,052 A | 6/1997 | Arney et al. | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,699,181 A | 12/1997 | Choi | |
| 5,710,656 A | 1/1998 | Goosen | |
| 5,719,068 A | 2/1998 | Suzawa et al. | |
| 5,734,177 A | 3/1998 | Sakamoto | |
| 5,771,116 A | 6/1998 | Miller et al. | |
| 5,786,927 A | 7/1998 | Greywall et al. | |
| 5,808,781 A | 9/1998 | Arney et al. | |
| 5,818,095 A | 10/1998 | Sampsell | |
| 5,825,528 A | 10/1998 | Goossen | |
| 5,838,484 A | 11/1998 | Goossen et al. | |
| 5,867,302 A | 2/1999 | Fleming | |
| 5,870,221 A | 2/1999 | Goossen | |
| 5,914,804 A | 6/1999 | Goossen | |
| 5,920,418 A | 7/1999 | Shiono et al. | |
| 5,961,848 A | 10/1999 | Jacquet et al. | |
| 6,028,689 A | 2/2000 | Michalicek et al. | |
| 6,031,653 A * | 2/2000 | Wang | 359/247 |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,124,851 A | 9/2000 | Jacobsen | |
| 6,242,932 B1 | 6/2001 | Hembree | |
| 6,262,697 B1 | 7/2001 | Stephenson | |
| 6,301,000 B1 | 10/2001 | Johnson | |
| 6,323,987 B1 | 11/2001 | Rinaudo et al. | |
| 6,327,071 B1 | 12/2001 | Kimura | |
| 6,335,235 B1 | 1/2002 | Bhekta et al. | |
| 6,351,329 B1 | 2/2002 | Greywall | |
| 6,356,378 B1 | 3/2002 | Huibers | |
| 6,377,233 B2 | 4/2002 | Colgan et al. | |
| 6,381,022 B1 | 4/2002 | Zavracky | |
| 6,384,952 B1 | 5/2002 | Clark et al. | |
| 6,400,738 B1 | 6/2002 | Tucker et al. | |
| 6,433,917 B1 | 8/2002 | Mei et al. | |
| 6,437,583 B1 | 8/2002 | Tartagni et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,738,194 B1 | 5/2004 | Ramirez et al. | |
| 6,768,555 B2 | 7/2004 | Chen | |
| 6,794,119 B2 | 9/2004 | Miles | |
| 6,813,059 B2 | 11/2004 | Hunter et al. | |
| 6,836,366 B1 | 12/2004 | Flanders et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,980,350 B2 | 12/2005 | Hung et al. | |
| 6,982,820 B2 | 1/2006 | Tsai | |
| 7,002,726 B2 | 2/2006 | Patel et al. | |
| 7,006,272 B2 | 2/2006 | Tsai | |
| 7,009,754 B2 | 3/2006 | Huibers | |
| 7,027,204 B2 | 4/2006 | Trisnadi et al. | |
| 7,034,981 B2 | 4/2006 | Makigaki | |
| 7,042,643 B2 | 5/2006 | Miles | |
| 7,046,422 B2 | 5/2006 | Kimura et al. | |
| 7,072,093 B2 | 7/2006 | Piehl et al. | |
| 7,113,339 B2 | 9/2006 | Taguchi et al. | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,184,195 B2 | 2/2007 | Yang | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,289,259 B2 | 10/2007 | Chui et al. | |
| 7,302,157 B2 | 11/2007 | Chui | |
| 7,321,456 B2 | 1/2008 | Cummings | |
| 7,321,457 B2 | 1/2008 | Heald | |
| 7,327,510 B2 | 2/2008 | Cummings et al. | |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,400,488 B2 | 7/2008 | Lynch et al. | |
| 7,405,852 B2 | 7/2008 | Brosnihan et al. | |
| 7,417,746 B2 | 8/2008 | Lin et al. | |
| 7,420,725 B2 | 9/2008 | Kothari | |
| 7,436,573 B2 | 10/2008 | Doan et al. | |
| 7,459,402 B2 | 12/2008 | Doan et al. | |
| 7,460,291 B2 | 12/2008 | Sampsell et al. | |
| 7,460,292 B2 | 12/2008 | Chou | |
| 7,476,327 B2 | 1/2009 | Tung et al. | |
| 7,477,440 B1 | 1/2009 | Huang et al. | |
| 7,492,503 B2 | 2/2009 | Chui | |
| 7,508,566 B2 | 3/2009 | Feenstra et al. | |
| 7,513,327 B1 | 5/2009 | Cummings | |
| 7,527,995 B2 | 5/2009 | Sampsell | |
| 7,532,377 B2 | 5/2009 | Miles | |
| 7,535,621 B2 | 5/2009 | Chiang | |
| 7,542,198 B2 | 6/2009 | Kothari | |
| 7,550,794 B2 | 6/2009 | Miles et al. | |
| 7,550,810 B2 | 6/2009 | Mignard et al. | |
| 7,554,711 B2 | 6/2009 | Miles | |
| 7,554,714 B2 | 6/2009 | Chui et al. | |
| 7,561,321 B2 | 7/2009 | Heald | |
| 7,564,612 B2 | 7/2009 | Chui | |
| 7,566,664 B2 | 7/2009 | Yan et al. | |
| 7,567,373 B2 | 7/2009 | Chui et al. | |
| 7,569,488 B2 | 8/2009 | Rafanan | |
| 7,612,932 B2 | 11/2009 | Chui et al. | |
| 7,612,933 B2 | 11/2009 | Djordjev | |
| 7,629,197 B2 | 12/2009 | Luo et al. | |
| 7,630,119 B2 | 12/2009 | Tung et al. | |
| 7,630,121 B2 | 12/2009 | Endisch et al. | |

| | | |
|---|---|---|
| 7,643,199 B2 | 1/2010 | Lan |
| 7,643,202 B2 | 1/2010 | Sasagawa |
| 7,649,671 B2 | 1/2010 | Kothari et al. |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,715,079 B2 | 5/2010 | Kogut et al. |
| 7,715,085 B2 | 5/2010 | Sasagawa |
| 7,719,500 B2 | 5/2010 | Chui |
| 7,738,157 B2 | 6/2010 | Miles |
| 7,742,220 B2 | 6/2010 | Kogut et al. |
| 7,746,539 B2 | 6/2010 | Sampsell |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,813,029 B2 | 10/2010 | Kothari et al. |
| 7,848,003 B2 | 12/2010 | Kothari et al. |
| 7,852,544 B2 | 12/2010 | Sampsell |
| 7,855,826 B2 | 12/2010 | de Groot |
| 7,876,489 B2 | 1/2011 | Gandhi et al. |
| 7,898,722 B2 | 3/2011 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Pichi et al. |
| 2004/0218251 A1 | 11/2004 | Piehl et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066640 A1 | 3/2006 | Kothari et al. |
| 2006/0066641 A1 | 3/2006 | Gally et al. |
| 2006/0077155 A1 | 4/2006 | Chui et al. |
| 2006/0077156 A1 | 4/2006 | Chui et al. |
| 2006/0082588 A1 | 4/2006 | Mizuno et al. |
| 2006/0082863 A1 | 4/2006 | Piehl et al. |
| 2006/0132383 A1 | 6/2006 | Gally et al. |
| 2006/0132927 A1 | 6/2006 | Yoon |
| 2006/0180886 A1 | 8/2006 | Tsang |
| 2006/0220160 A1 | 10/2006 | Miles |
| 2006/0262126 A1 | 11/2006 | Miles |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0121118 A1 | 5/2007 | Gally et al. |
| 2007/0138608 A1 | 6/2007 | Ikehashi |
| 2007/0153860 A1 | 7/2007 | Chang-Hasnain et al. |
| 2007/0177247 A1 | 8/2007 | Miles |
| 2007/0216987 A1 | 9/2007 | Hagood et al. |
| 2007/0242358 A1 | 10/2007 | Lin et al. |
| 2007/0247704 A1 | 10/2007 | Mignard |
| 2007/0253054 A1 | 11/2007 | Miles |
| 2007/0279730 A1 | 12/2007 | Heald |
| 2007/0285761 A1 | 12/2007 | Zhong et al. |
| 2008/0002299 A1 | 1/2008 | Thurn |
| 2008/0013145 A1 | 1/2008 | Chui et al. |
| 2008/0030657 A1 | 2/2008 | Wu et al. |
| 2008/0037093 A1 | 2/2008 | Miles |
| 2008/0055706 A1 | 3/2008 | Chui et al. |
| 2008/0055707 A1 | 3/2008 | Kogut et al. |
| 2008/0068697 A1 | 3/2008 | Haluzak et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0151347 A1 | 6/2008 | Chui et al. |
| 2008/0158645 A1 | 7/2008 | Chiang |
| 2008/0186581 A1 | 8/2008 | Bita et al. |
| 2008/0218834 A1 | 9/2008 | Wang |
| 2008/0247028 A1 | 10/2008 | Chui et al. |
| 2008/0297880 A1 | 12/2008 | Steckl et al. |
| 2009/0021884 A1 | 1/2009 | Nakamura |
| 2009/0073534 A1 | 3/2009 | Lee et al. |
| 2009/0078316 A1 | 3/2009 | Khazeni et al. |
| 2009/0101192 A1 | 4/2009 | Kothari et al. |
| 2009/0103166 A1 | 4/2009 | Khazeni et al. |
| 2009/0122384 A1 | 5/2009 | Felnhofer et al. |
| 2009/0126777 A1* | 5/2009 | Khazeni et al. ............... 136/246 |
| 2009/0159123 A1 | 6/2009 | Kothari et al. |
| 2009/0201566 A1 | 8/2009 | Kothari |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0225395 A1 | 9/2009 | Ganti et al. |
| 2009/0231666 A1 | 9/2009 | Gudlavalleti et al. |
| 2009/0251761 A1 | 10/2009 | Khazeni et al. |
| 2009/0256218 A1 | 10/2009 | Mignard et al. |
| 2009/0257105 A1 | 10/2009 | Xu et al. |

| | | | |
|---|---|---|---|
| 2009/0273823 A1 | 11/2009 | Tung et al. | |
| 2009/0273824 A1 | 11/2009 | Sasagawa | |
| 2009/0279162 A1 | 11/2009 | Chui | |
| 2009/0293955 A1 | 12/2009 | Kothari et al. | |
| 2009/0323153 A1 | 12/2009 | Sampsell | |
| 2010/0014148 A1 | 1/2010 | Djordjev | |
| 2010/0039370 A1 | 2/2010 | Miles | |
| 2010/0051089 A1 | 3/2010 | Khazeni et al. | |
| 2010/0053148 A1 | 3/2010 | Khazeni et al. | |
| 2010/0080890 A1 | 4/2010 | Tung et al. | |
| 2010/0085626 A1 | 4/2010 | Tung et al. | |
| 2010/0096006 A1 | 4/2010 | Griffiths | |
| 2010/0096011 A1 | 4/2010 | Griffiths | |
| 2010/0118382 A1 | 5/2010 | Kothari et al. | |
| 2010/0128337 A1 | 5/2010 | Tung | |
| 2010/0236624 A1 | 9/2010 | Khazeni et al. | |
| 2010/0238572 A1 | 9/2010 | Tao et al. | |
| 2010/0309572 A1 | 12/2010 | Mignard | |
| 2011/0019380 A1 | 1/2011 | Miles | |
| 2011/0026095 A1 | 2/2011 | Kothari et al. | |
| 2011/0026096 A1 | 2/2011 | Miles | |
| 2011/0038027 A1 | 2/2011 | Miles | |
| 2011/0044496 A1 | 2/2011 | Chui et al. | |
| 2011/0063712 A1 | 3/2011 | Kothari et al. | |
| 2011/0069371 A1 | 3/2011 | Kothari et al. | |
| 2011/0080632 A1 | 4/2011 | Miles | |
| 2011/0090554 A1 | 4/2011 | Tung | |
| 2011/0090570 A1 | 4/2011 | DeCusatis et al. | |
| 2011/0116156 A1 | 5/2011 | Kothari | |
| 2011/0134505 A1 | 6/2011 | Sasagawa | |
| 2011/0170166 A1 | 7/2011 | Miles | |
| 2011/0170167 A1 | 7/2011 | Miles | |
| 2011/0170168 A1 | 7/2011 | Endisch et al. | |
| 2011/0188109 A1 | 8/2011 | Chui et al. | |
| 2011/0188110 A1 | 8/2011 | Miles | |
| 2011/0193770 A1 | 8/2011 | Gally et al. | |
| 2011/0194169 A1 | 8/2011 | Ganti et al. | |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 928 028 | 6/2008 |
| JP | 56-088111 | 7/1981 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| WO | WO 98/14804 | 4/1998 |
| WO | WO 98/43129 | 10/1998 |
| WO | WO 01/53113 | 7/2001 |
| WO | WO 02/24570 | 3/2002 |
| WO | WO 02/086582 | 10/2002 |
| WO | WO 03/105198 | 12/2003 |
| WO | WO 2006/035698 | 4/2006 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |

OTHER PUBLICATIONS

Qualcomm MEMS Technologies, Inc., May 2008, Interferometric Modulator (IMOD) Technology Overview, White Paper, 14 pp.

Nakagawa et al., Feb. 1, 2002, Wide-field-of-view narrow-band spectral filters based on photonic crystal nanocavities, Optics Letters, 27(3):191-193.

Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.

Cacharelis et al., 1997, A Reflective-mode PDLC Light Valve Display Technology, Proceedings of European Solid State Device Research Conference (ESSDERC), pp. 596-599.

Dokmeci et al., Dec. 2004, Two-axis single-crystal silicon micromirror arrays, Journal of Microelectromechanical Systems, 13(6):1006-1017.

Maier et al., 1996, 1.3 active matrix liquid crystal spatial light modulator with 508 dpi resolution, SPIE vol. 2754, pp. 171-179.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

ISR and WO dated Dec. 22, 2010 in PCT/US10/049851.

Conner, Hybrid Color Display Using Optical Interference Filter Array, SID Digest, pp. 577-580 (1993).

Feenstra et al., Electrowetting displays, Liquavista BV, 16 pp., Jan. 2006.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

Longhurst, 1963, Chapter IX: Multiple Beam Interferometry, in Geometrical and Physical Optics, pp. 153-157.

Miles, A New Reflective FPD Technology Using Interferometric Modulation, Journal of the SID, May 4, 1997.

Miles, Interferometric modulation: MOEMS as an enabling technology for high performance reflective displays, Proceedings of SPIE, 4985:131-139, 2003.

Pape et al., Characteristics of the deformable mirror device for optical information processing, Optical Engineering, 22(6):676-681, Nov.-Dec. 1983.

Taii et al., A transparent sheet display by plastic MEMS, Journal of the SID 14(8):735-741, 2006.

Tolansky, 1948, Chapter II: Multiple-Beam Interference, in Multiple-bean Interferometry of Surfaces and Films, Oxford at the Clarendon Press, pp. 8-11.

IPRP dated Apr. 12, 2012 in PCT/US10/049851.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

INTERFEROMETRIC DISPLAY WITH INTERFEROMETRIC REFLECTOR

BACKGROUND

1. Field

The field of invention relates to electromechanical systems.

2. Description of the Related Art

Electromechanical systems include devices having electrical and mechanical elements, actuators, transducers, sensors, optical components (e.g., mirrors), and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers or that add layers to form electrical and electromechanical devices.

One type of electromechanical systems device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other display devices.

Embodiments described herein may include a reflective display having interferometric modulators. One or more of the interferometric modulators may include an absorber layer, an interferometric reflector layer that is movable with respect to the absorber layer, and an optically resonant cavity defined by the interferometric reflector layer and the absorber layer.

In one embodiment, an interferometric modulator comprises an interferometric reflector. In one aspect, the interferometric reflector can be movable. The interferometric reflector can include a first reflective surface, a second reflective surface, and an optical resonant layer defined by the first reflective surface and the second reflective surface. The first reflective surface and/or second reflective surface can be partially reflective. The first reflective and second reflective surfaces can be configured to move simultaneously and/or independently. In one aspect, the first and/or second reflective surfaces comprise aluminum, gold, silver, molybdenum, chromium, copper, nickel, and/or combinations thereof. According to another aspect, the first and second reflective surfaces each have a thickness that is about the same. In one aspect, the optical resonant layer comprises air and/or a generally transparent dielectric, for example, silicon oxy-nitride.

In yet another aspect, the interferometric reflector is configured to transmit a certain spectrum of light at a transmission peak wavelength such that the interferometric modulator has a diminished reflectance of light at the transmission peak wavelength. In one aspect, the transmission peak wavelength is between about 380 nm and about 750 nm. In another aspect, the amount of light transmitted by the interferometric reflector is less than about 5% of the reflectance of the interferometric modulator.

In another aspect, the interferometric modulator includes an absorber layer and an optical resonant cavity defined between the absorber layer and the interferometric reflector. The interferometric reflector can be configured to move in a direction generally perpendicular to the absorber layer, for example, between at least two positions. The optical resonant cavity can comprise air and/or a generally transparent dielectric, for example, silicon oxy-nitride. In one aspect, the absorber comprises molybdenum, titanium, tungsten, chromium, molybdenum chromium, lead selenide, and/or combinations thereof. The interferometric modulator can also include a substrate layer disposed such that the absorber layer is between the substrate layer and the interferometric reflector. In one aspect, the substrate layer comprises glass.

In another embodiment, an interferometric modulator device includes an absorber layer and an interferometric reflector. The interferometric reflector can be configured to move in a direction generally perpendicular to the absorber layer through a variable air gap located at least partially between the absorber layer and the interferometric reflector element. In some embodiments, the interferometric reflector includes a first reflective layer, a second reflective layer, and an optical resonant layer disposed between the first reflective layer and the second reflective layer. In one aspect, the interferometric reflector is configured to transmit a certain spectrum of light at a transmission peak wavelength such that the interferometric display has a diminished reflectance of light at the transmission peak wavelength. In another aspect, the interferometric modulator also includes an optical resonant cavity disposed between the absorber layer and the interferometric reflector. The optical resonant cavity can comprise a generally transparent dielectric and/or air.

In one aspect, the interferometric reflector is tuned to transmit a certain spectrum of light at a transmission peak wavelength within a visible range of light, for example, between about 380 nm and about 750 nm. In one aspect, the absorber layer include molybdenum, titanium, tungsten, chromium, molybdenum chromium, lead selenide, and/or combinations thereof. The first reflective layer and/or second reflective layer can comprise aluminum, gold, silver, molybdenum, chromium, copper, nickel, and/or combinations thereof. In one aspect the first reflective layer has a thickness between about 1 nm and about 50 nm. In another aspect, the second reflective layer has a thickness between about 5 nm and about 200 nm. In yet another aspect, the optical resonant layer has a thickness between about 200 nm and about 3000 nm.

According to another aspect, the interferometric modulator includes a display, a processor that is configured to communicate with the display, the processor being configured to process image data, and a memory device that is configured to communicate with the processor. In one aspect, the interferometric modulator device includes a driver circuit configured to send at least one signal to the display. In another aspect, the interferometric modulator device includes a controller configured to send at least a portion of the image data to the driver circuit. In one aspect, the interferometric modulator includes an image source module configured to send the image data to the processor. The image source module can include at least one of a receiver, transceiver, and/or transmitter. In another aspect, the interferometric modulator device includes an input device configured to receive input data and to communicate the input data to the processor.

In one embodiment, an interferometric modulator comprises an absorber means and an interferometric reflector means. The interferometric reflector means can be configured to transmit a certain spectrum of light at a transmission peak wavelength such that the interferometric modulator has a diminished reflectance of light at the transmission peak wavelength. In one aspect, the absorber means includes an absorber layer. In another aspect, the interferometric reflector means comprises a first reflective surface, a second reflective surface, and an optical resonant layer defined between the first reflective surface and the second reflective surface.

In another embodiment, a method of manufacturing an interferometric modulator device comprises providing an absorber layer, providing an interferometric reflector, and positioning the interferometric reflector relative to the absorber layer to create an optical resonant cavity between at least a portion of the interferometric reflector and at least a portion of the absorber layer.

In one embodiment, a method of reflecting light in a display element comprises receiving light incident on the display element, reflecting a first portion of the incident light from a first layer of the display element, transmitting a second portion of the incident light through the first layer, reflecting a third portion of the incident light from a second layer of the display element, transmitting a fourth portion of the incident light through the second layer, reflecting a fifth portion of the incident light from a third layer of the display element, and transmitting a sixth portion of the incident light through the third layer of the display element, wherein the sixth portion of light comprises a spectrum of light at a transmission peak wavelength, and wherein a resultant light comprising a portion of the first portion, third portion, and fifth portion of light is reflected from the display element and has a diminished brightness at the transmission peak wavelength. In one aspect, the second layer is movable relative to the first layer. In another aspect, the third layer is movable relative to the first layer.

DETAILED DESCRIPTION OF CERTAIN EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Reflective display devices can incorporate interferometric modulators to selectively absorb and/or reflect light incident thereon using principles of optical interference. Interferometric modulators can comprise an absorber, a reflector that is movable with respect to the absorber, and an optical resonant cavity defined between the absorber and the reflector. The reflector of an interferometric modulator can be moved to two or more different positions which changes the size of the optical resonant cavity thereby affecting the reflectance of the interferometric modulator. The reflectance spectrums of interferometric modulators can create fairly broad spectral bands which can be shifted across the visible wavelengths to generate different colors. The position of the spectral band can be adjusted by changing the thickness of the optical resonant cavity. In some embodiments, an interferometric modulator includes an interferometric reflector, or etalon reflector, that is configured to induce transmission peaks at certain wavelengths that result in one or more reflectance "dips" in one or more spectrums of the light reflected towards a viewer (e.g., decreased reflectance of certain wavelengths). Interferometric reflectors can include two reflective surfaces separated by a reflector cavity or optical resonant layer, for example, a transparent dielectric material. Reflectance dips can be used to increase the display gamut and/or to reflect colors from the interferometric display that are currently impossible to achieve without using an interferometric reflector.

Figure 1:
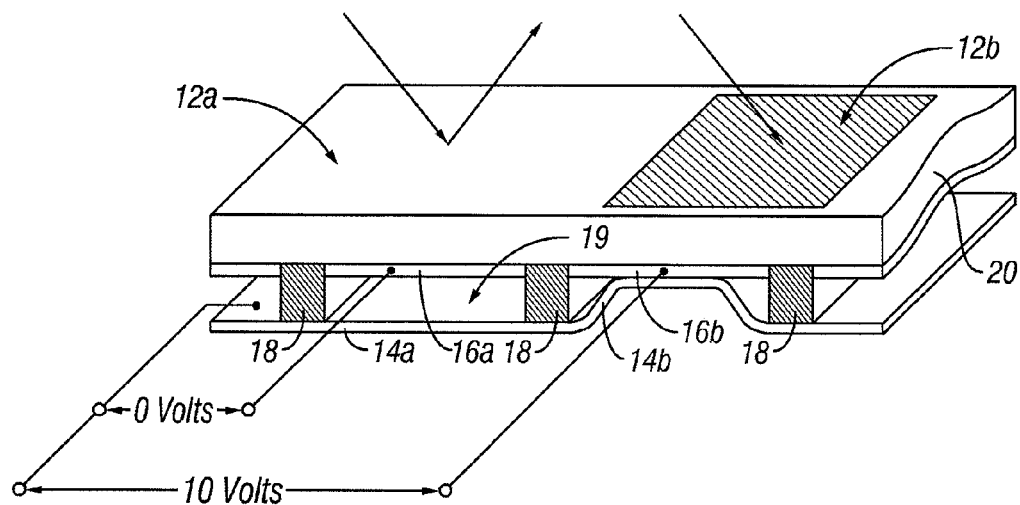
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
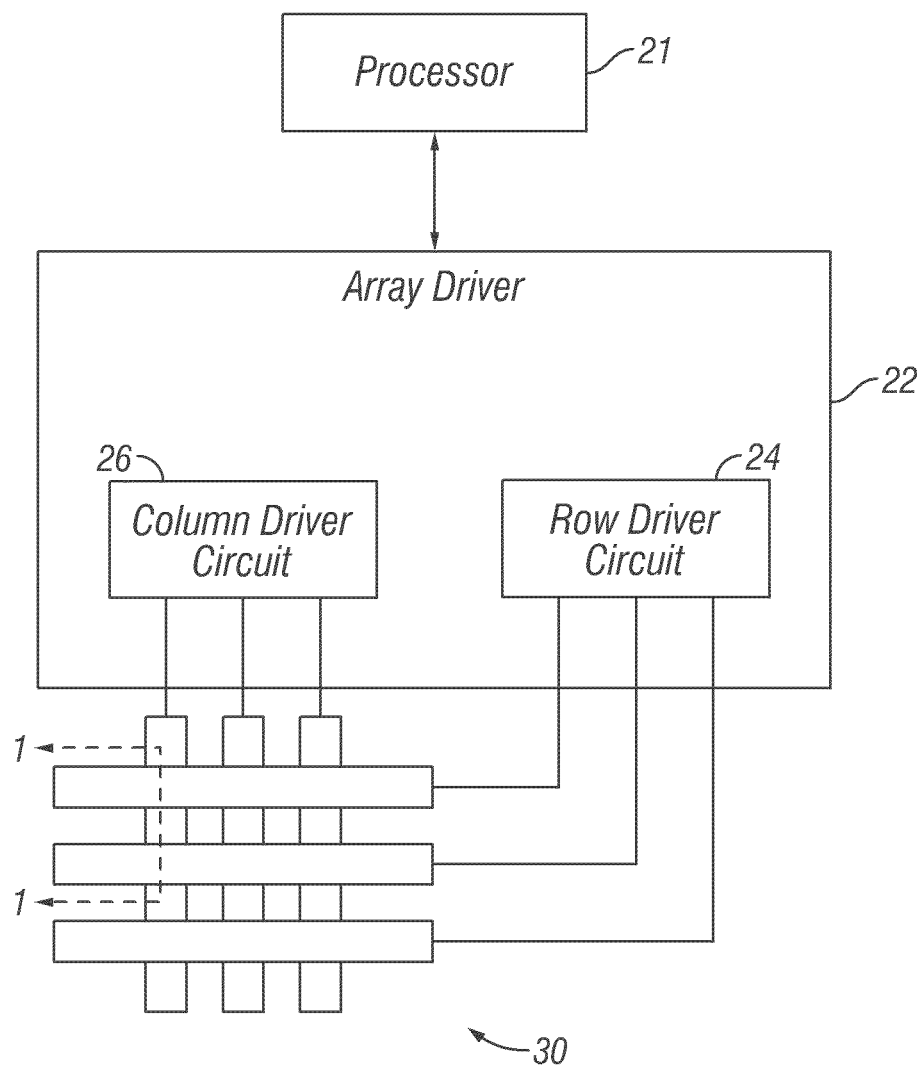
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
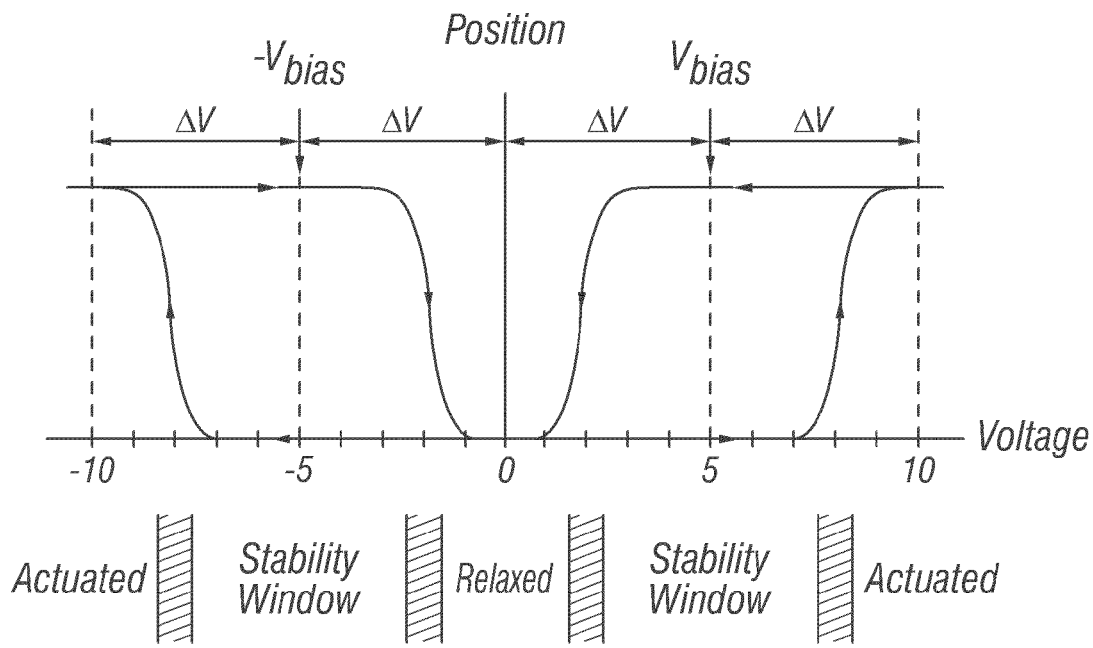
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to +$V_{bias}$, and the appropriate row to −ΔV. In this embodiment, releasing the pixel is accomplished by setting the appropriate column to −$V_{bias}$, and the appropriate row to the same −ΔV, producing a zero volt potential difference across the pixel.

Figure 5A:
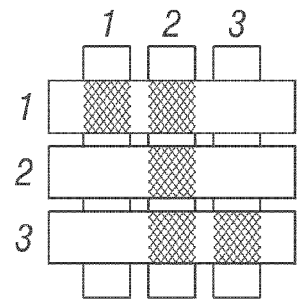
FIGS. 5A and 5B illustrate one exemplary timing diagram for row and column signals that may be used to write a frame of display data to the 3×3 interferometric modulator display of FIG. 2.
Figure 5B:
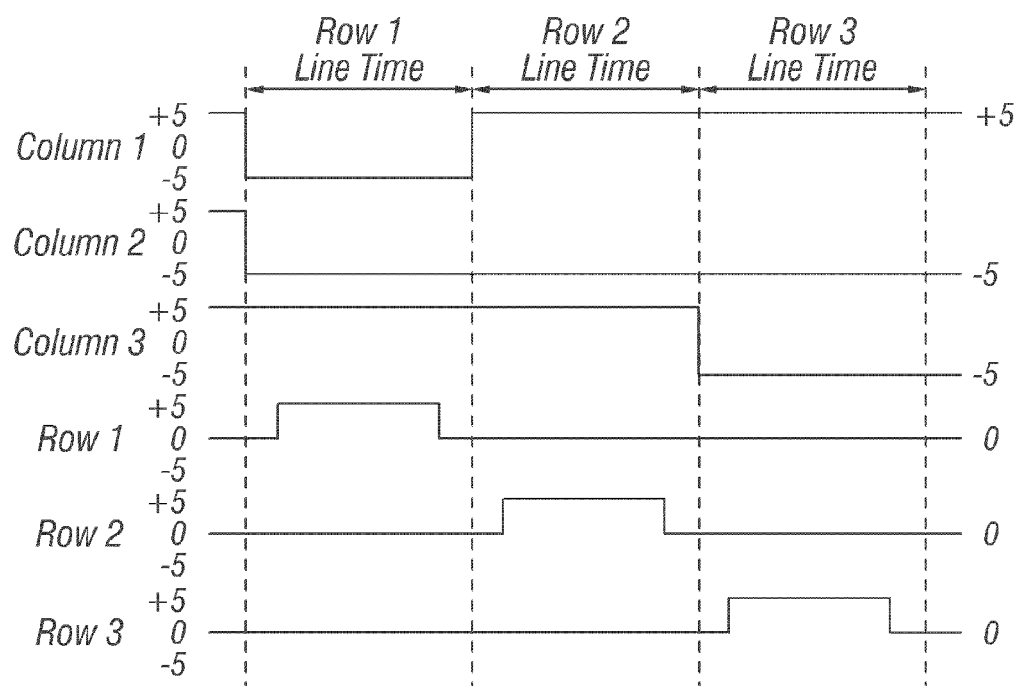

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
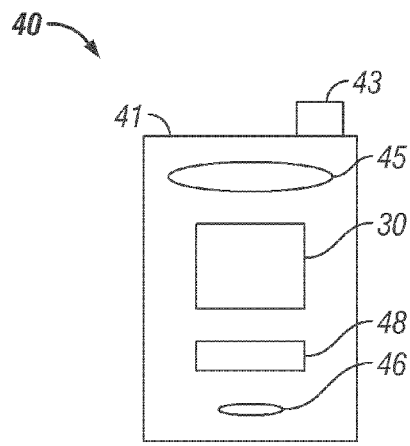
FIGS. 6A and 6B are system block diagrams illustrating an embodiment of a visual display device comprising a plurality of interferometric modulators.
Figure 6B:
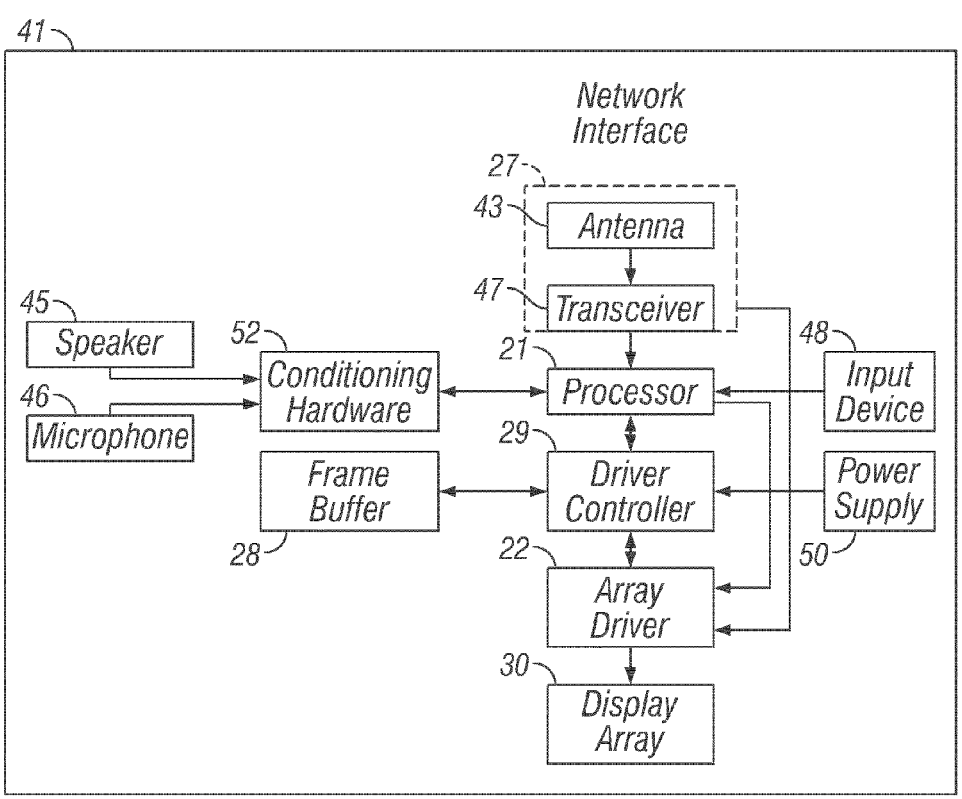

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
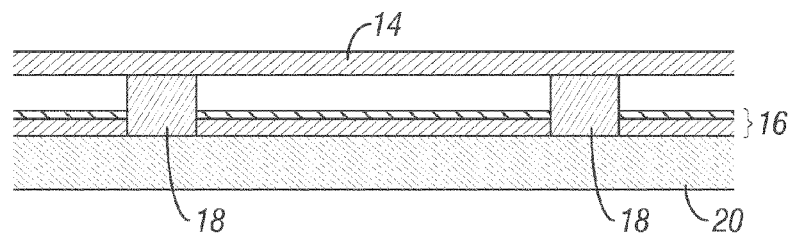
FIG. 7A is a cross-section of the device of FIG. 1.
Figure 7B:
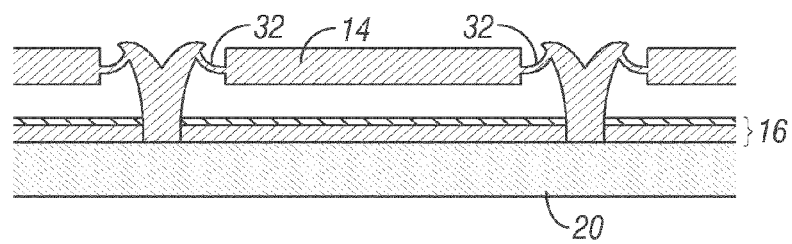
FIG. 7B is a cross-section of an alternative embodiment of an interferometric modulator.
Figure 7C:
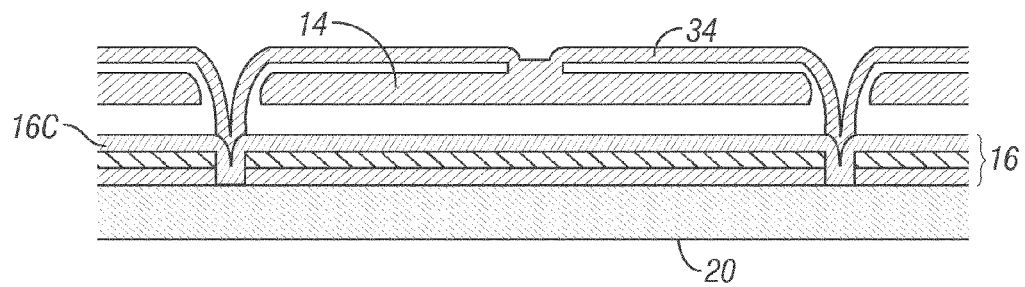
FIG. 7C is a cross-section of another alternative embodiment of an interferometric modulator.
Figure 7D:
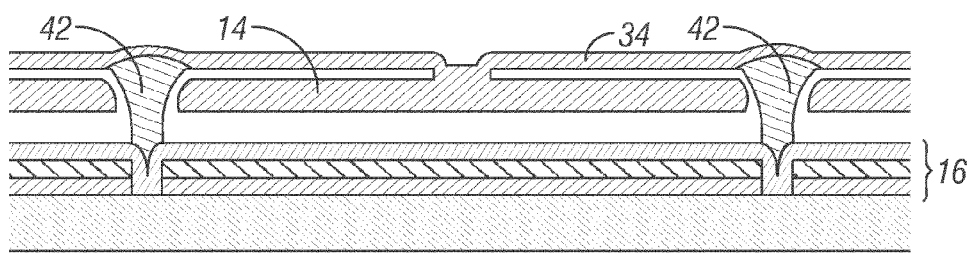
FIG. 7D is a cross-section of yet another alternative embodiment of an interferometric modulator.
Figure 7E:
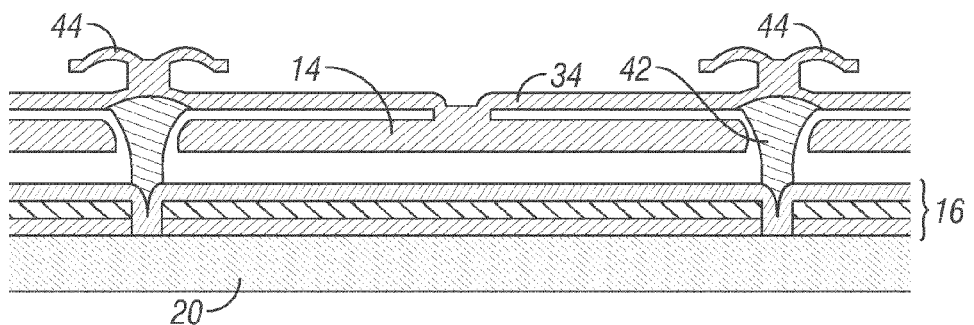
FIG. 7E is a cross-section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

A common problem for color displays, regardless of whether they are of the self-luminous type or the non-self-luminous type, is the synthesis of a full-color image from a limited set of primary colors. Many color displays include red, green, and blue display elements or sub-pixels. Other colors are produced in such a display by varying the relative intensity of light produced by the red, green, and blue elements. Such mixtures of red, green, and blue are perceived by the human eye as other colors. The relative values of red, green, and blue in such a color system can be referred to as tristimulus values in reference to the stimulation of red, green, and blue light-sensitive portions of the human eye. The range of colors that can be produced by a particular display can be referred to as the color gamut of the display. While an exemplary color system based on red, green, and blue are disclosed herein, in other embodiments, the display can include modulators having sets of colors that define other color systems in terms of sets of primary colors other than red, green, and blue.

One method of increasing the gamut of an interferometric modulator display disclosed herein includes inducing one or more transmission peaks with different spectral widths, positions, and/or amplitudes at various wavelengths within the visible spectrum to affect the color reflected from an interferometric modulator towards a viewer. The transmission peaks result in corresponding reflectance dips in the reflection spectrum that change the color reflected from the display. The spectral widths positions and amplitudes of the transmission peaks can be tuned to increase the gamut of the overall display or create colors that are currently impossible to achieve. In some cases, these transmission peaks can be generated using an interferometric reflector, or etalon reflector, in an interferometric modulator. In other words, in some embodiments the reflector structure itself includes an interferometric cavity. Such a reflector can be configured to be static or movable.

In some embodiments, the interferometric reflector can include two partially reflective layers separated by one or more optically transparent layers, for example, one or more dielectric layers. The interferometric reflector can be configured to move relative to an absorber layer to selectively transmit certain wavelengths of light and modulate light reflected and/or transmitted from the absorber side of the modulator. Non-limiting examples of interferometric modulators which include interferometric reflectors are described further herein below.

Interferometric reflectors can be tuned to create a transmission peak at a certain wavelength in order to create a dip in the reflectance spectrum observed by a viewer at the same wavelength. The dip induced by the interferometric reflector changes the color observed by a viewer as compared to the color observed from a similar display where a standard reflector is used. The light transmitted through the interferometric reflector can be considered "lost" light because it is not reflected back towards a viewer and lowers the overall brightness of the display. However, in some cases, the amount of light lost when using an interferometric reflector can be less than about 1.5% of the total light incident on the display. Thus, interferometric reflectors can be used to increase the color gamut of the display without significantly lowering the brightness of the display.

Figure 8A:
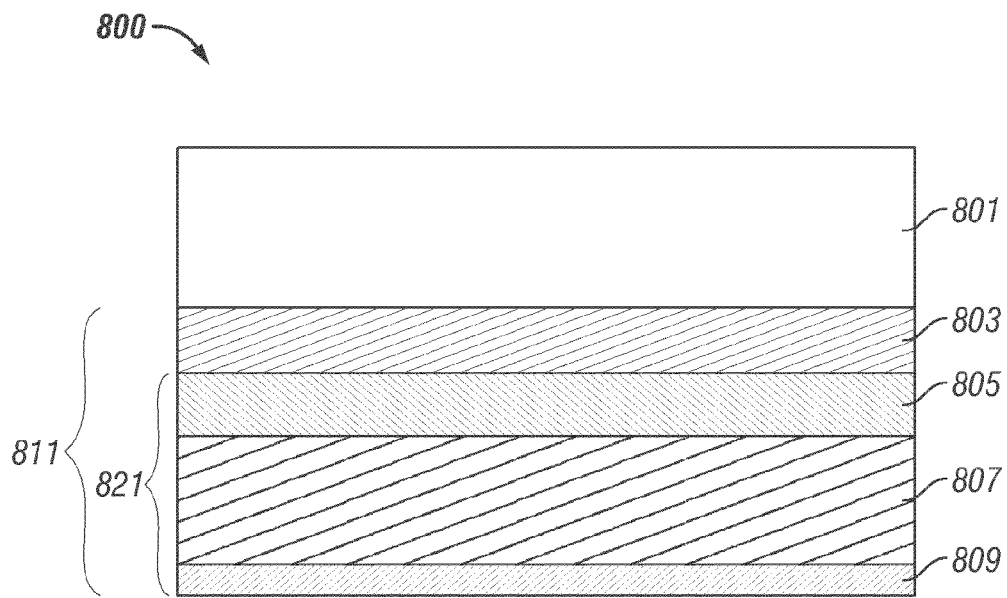
FIG. 8A is a cross-section of an additional embodiment of an interferometric modulator.
Figure 9A:
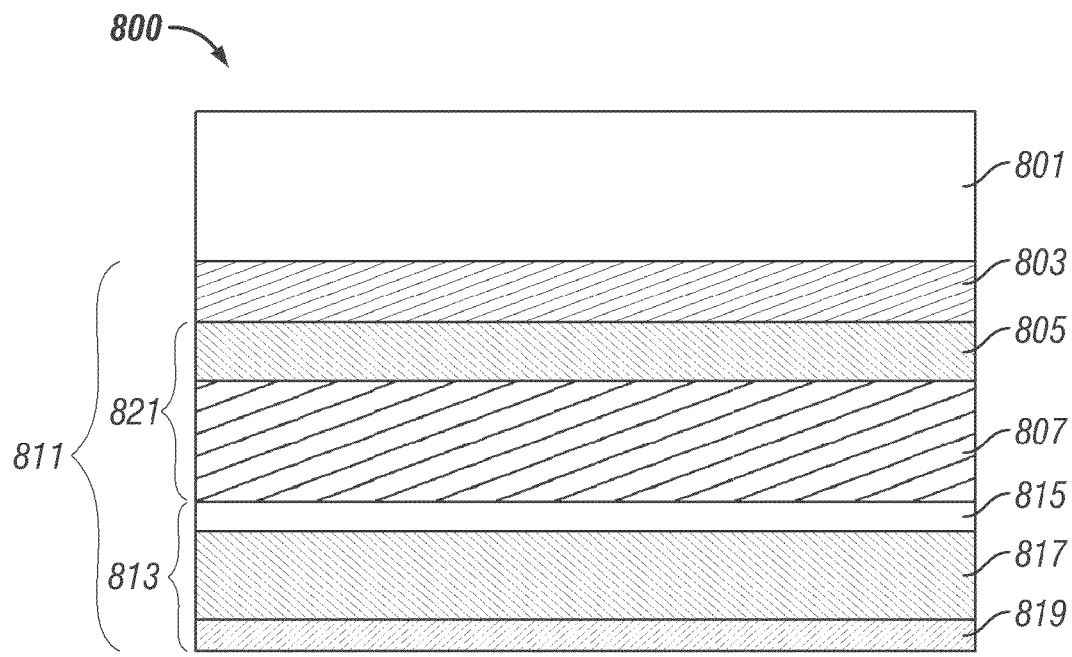
FIG. 9A is a cross-section of an alternative embodiment of an interferometric modulator including an interferometric reflector.

FIGS. 8A and 9A illustrate two embodiments of interferometric modulators. The relative sizes of items in the attached figures have been selected for illustrative purposes only. Thus, distances and sizes shown in the figures are not necessarily to scale and are not intended to be representative of any particular embodiment of an interferometric modulator or interferometric reflector.

FIG. 8A is a cross-sectional view of an embodiment of an interferometric display 800 including an interferometric modulator ("IMOD") 811. The IMOD 811 can be disposed adjacent to a substrate layer 801. The substrate 801 can comprise any suitable substrate, for example, acrylic, glass, polyethylene terephthalate ("PET"), and/or polyethylene terephthalate glycol ("PET-G"). An IMOD 811 can include an absorber layer 803, a reflector layer 809, and an optical resonant cavity layer 821 defined between the absorber layer 803 and the reflector layer 809. The reflector layer 809 can move through an air gap 807 in a direction generally perpendicular to the absorber between an open state (shown) and a closed state as discussed above with reference to FIG. 1. The interferometric modulator 811 can be configured to reflect a color, for example, red, green, or blue, from the substrate 801 side toward one or more viewers when the reflector 809 is in the open state and can be configured to reflect a dark color, for example, black or dark blue, when the reflector is in the activated state.

In the embodiment shown in FIG. 8A, the absorber layer 803 defines the top of the optical resonant cavity 821 and the reflector layer 809 defines the bottom of the optical resonant cavity 821. The thickness of the absorber 803 and reflector 809 layers can be selected to control relative amounts light reflected by the interferometric reflector 811 and light transmitted through the interferometric modulator 811. The thickness of the absorber 803 can range from about 40 Å to about 500 Å. The thickness of the reflector layer 809 can range from about 40 Å to about 500 Å. In some embodiments, the absorber 803 and reflector 809 can comprise materials that are reflective and conductive. Both the absorber 803 and reflector 809 layers can comprise metal, and both can be partially transmissive. The absorber layer 803 can comprise various materials, for example, molybdenum (Mo), titanium (Ti), tungsten (W), and chromium (Cr), as well as alloys, for example, MoCr or PbSe. The reflector layer 809 can comprise various materials, for example, aluminum (Al), copper (Cu), silver (Ag), molybdenum (Mo), gold (Au), and chromium (Cr), as well as alloys, for example, MoCr.

The amount of light reflected or transmitted through the reflector layer 809 can be significantly increased or reduced by varying the thickness and the composition of the reflector layer 809. The resulting color of light reflected from the interferometric modulator is based on light interference principles which are affected by the size (e.g., thickness) of the optical resonant cavity 821 and the material properties of the absorber layer 803. Changing the reflector thickness 809 will affect the intensity of the reflected color and thus influence the intensity of transmissions through the reflector 809.

In some embodiments of IMODs, the optical resonant cavity 821 is defined by a solid layer, for example, an optically transparent dielectric layer (e.g., SiON), or a plurality of layers. In other IMODs, the optical resonant cavity 821 is defined by an air gap, or the combination of an optically transparent layer 805 and the air gap 807. The thickness of the optical resonant cavity 821 can be tuned to maximize or minimize the reflection of one or more specific colors from the IMOD. In some embodiments, the thickness of the optical resonant cavity 821 can range from about 1000 Å to about 5000 Å, or greater. The physical thickness of the optical resonant cavity 821 can depend on the material(s) forming it. For example, an air cavity can be physically thicker than a cavity formed from SiON for an equivalent optical thickness because SiON has a higher refractive index than air. In some embodiments, the configured thickness of the optical resonant cavity 821 can be chosen based on the optical thickness of the cavity 821. As used herein, "optical thickness" refers to the equivalent optical path length of the cavity 821 measured in terms of the wavelength of the peak reflection from an IMOD 811. In other words, the design of cavity 821 can be usefully specified as an optical thickness (e.g., a number of wavelengths), as the actual physical spacing may vary significantly depending on both the design of the IMOD 811, and the material(s) chosen. In some embodiments, the optical thickness of the optical resonant cavity 821 can range from about one-quarter to about ten times the reflective peak wavelength of the IMOD 811. Thus, the color (or colors) reflected by the IMOD can be selected by configuring the optical resonant cavity 821 to have a certain thickness.

Figure 8B:
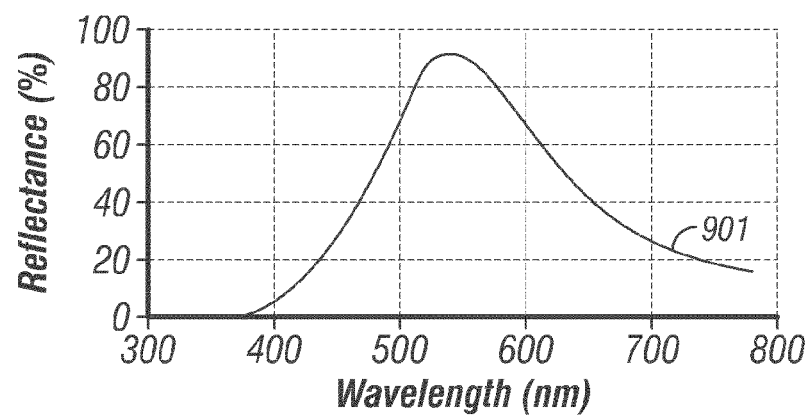
FIG. 8B shows simulated reflection versus wavelength from the front (substrate) side of an interferometric modulator configured as shown in FIG. 8A.

FIG. 8B is a diagram illustrating a light reflectance curve 901 for light reflecting from the substrate side of an interferometric modulator configured as shown in FIG. 8A when the reflector is in the open (or unactuated state). The interferometric modulator includes an absorber layer that is about 50 Å thick, an optical resonant cavity that is about 2440 Å thick, and a reflector layer that is about 300 Å thick. As illustrated in FIG. 8B, the reflection peak for this particular interferometric modulator is about 90% at a wavelength of about 540 nm. Thus, the interferometric modulator is tuned to reflect green light from the substrate side of the modulator when the reflector is in the open state. As discussed above, the interferometric modulator appears dark when actuated. The reflection peak and wavelength of light reflected from the substrate side of the interferometric modulator can be changed by adjusting the absorber layer, optical resonant cavity, and/or reflector layer. For example, the interferometric modulator can be configured to reflect other colors when the reflector is in the open position.

FIG. 9A is a cross-sectional view illustrating another embodiment of a portion of an interferometric display 800. FIG. 9A includes an interferometric reflector 813 instead of the reflector 809 shown in FIG. 8A. The interferometric reflector 813 can be tuned to induce transmission peaks, resulting in corresponding dips in the spectrum of light reflected towards a viewer, having different spectral widths, positions, or amplitudes. Thus, the term "interferometric reflector" as used herein refers to an element that selectively transmits and reflects certain wavelengths of light on its own and can be used within an interferometric display to selectively reflect and transmit certain wavelengths of light from the display as a whole. In some embodiments, an interferometric reflector 813 can resemble a Fabry-Perot etalon or etalon reflector which can exhibit transmission peaks corresponding to the resonance of the etalon.

The interferometric reflector 813 includes a top reflective layer 815, a bottom reflective layer 819, and an optical resonant layer 817 disposed between the top reflective layer and the bottom reflective layer. Transmission peaks induced by the interferometric reflector 813 can be selected (or "tuned") by varying the thickness or index of refraction of the optical resonant layer and/or by varying the reflectance of the top and bottom reflective layers 815, 819. The reflectance of the top and bottom reflective layers 815, 819 can be affected by the thicknesses of the layers and/or by the materials chosen to form the layers.

Both the top and bottom reflective layers 815, 819 can comprise metal and both can be configured to be partially transmissive. The reflective layers 815, 819 can comprise, for example, aluminum (Al), silver (Ag), molybdenum (Mo), gold (Au), and/0r chromium (Cr), as well as alloys, for example, MoCr. Reflective layers 815, 819 can be formed of the same materials or they can be formed of different materials. For example, the top reflective layer 815 can comprise aluminum and the bottom reflective layer can comprise aluminum.

The thicknesses of the top and bottom reflective layers 815, 819 can vary depending on the desired reflectance and transmission characteristics. In some embodiments, the thickness of the top reflective layer 815 is less than the bottom reflective layer 819. In other embodiments, the thickness of the top reflective layer 815 is about the same as the thickness of the bottom reflective layer 819. The thicknesses of the top and bottom reflective layers 815, 819 can range from about 5 Å to about 1200 Å. For example, the top reflective layer can be about 120 Å and the bottom reflective layer can be about 600 Å.

The optical resonant layer 817 is formed of one or more optically resonant materials. Examples of suitable optically resonant materials include air and optically transparent dielectrics (e.g., SiON). The optical resonant layer 817 can be formed of a single layer or a plurality of layers. In one embodiment, the optical resonant layer 817 comprises a single layer of SiON. In another embodiment, the optical resonant layer 817 comprises air. In another embodiment, the optical resonant layer 817 comprises one or more layers of air and a transparent dielectric.

In embodiments where the optical resonant layer 817 comprises a layer of air, the top and bottom reflective layers 815, 819 can remain at a fixed distance from one another or they can move relative to one another. For example, an interferometric reflector 813 can include an optical resonant layer 817 formed of air and the bottom reflective layer 819 can move with respect to the top reflective layer 815 changing the thickness of the optical resonant layer as the bottom reflector moves. The thickness of the optical resonant layer 817 as defined by the distance between the top and bottom reflective layers 815, 819 can be tuned to adjust the position of the transmission peak or the number of orders transmission peaks as discussed in more detail below. Thus, the interferometric reflector 813 can be configured to induce one or more transmission peaks that vary over time as the distance between the top and bottom reflective layers 815, 819 changes.

Figure 9B:
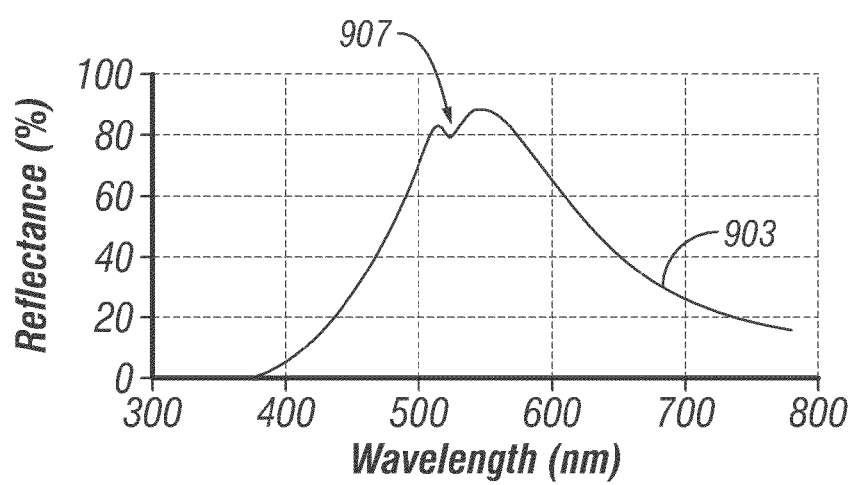
FIG. 9B shows simulated reflection versus wavelength from the front (substrate) side of an interferometric modulator configured as shown in FIG. 9A.

FIG. 9B is a diagram illustrating a light reflectance curve 903 for light reflecting from the substrate side of an interferometric modulator that comprises an interferometric reflector when the interferometric reflector is in the open state. In this example, the interferometric reflector includes a first reflective layer formed of aluminum having a thickness of about 30 Å, an optical resonant layer formed of SiON having a thickness of about 1300 Å, and a second reflective layer formed of aluminum having a thickness of about 30 Å.

As illustrated in FIG. 9B, the light reflectance curve 903 includes a dip 907 at a wavelength of about 520 nm due to the transmission peak induced by the interferometric reflector. This reflectance dip 907 changes the appearance of the reflected light 903 when compared with light from an interferometric modulator that uses a reflector that does not have an optical resonant layer within the reflector and, accordingly, that does not induce a reflectance dip. The light reflected in FIG. 9B appears different to a viewer than the light reflected in FIG. 9A because the transmission peak created by the interferometric reflector "flattens" the reflectance curve across a wider range of wavelengths.

Figure 9C:
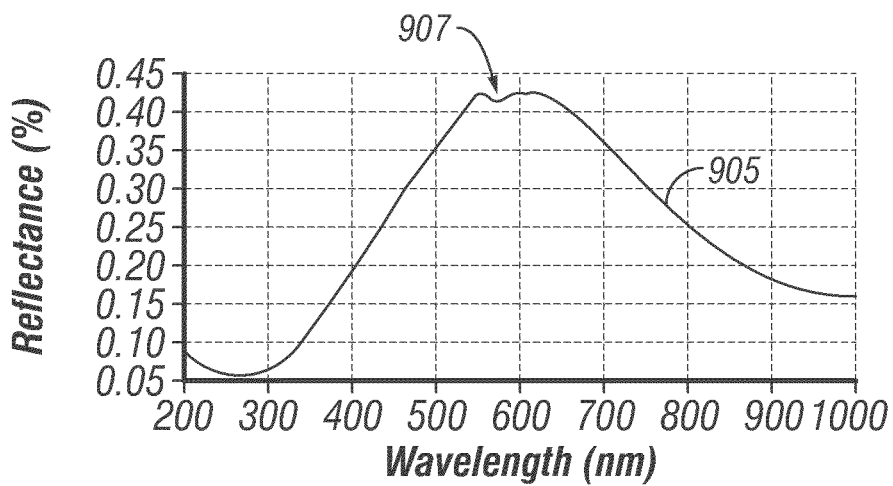
FIG. 9C shows measured reflection versus wavelength from the front (substrate) side of an interferometric modulator configured as shown in FIG. 9A.

FIG. 9C is a diagram illustrating a light reflectance curve 905 for light reflecting from the substrate side of an interferometric modulator, which includes an interferometric reflector, when the interferometric reflector is in the open state. In this example, the interferometric reflector includes a first reflective layer formed of aluminum having a thickness of about 30 Å, an optical resonant layer formed of SiON having a thickness of about 1300 Å, and a second reflective layer formed of aluminum having a thickness of about 30 Å. The light reflectance curve 905 includes a dip 907 at a wavelength of about 575 nm due to the transmission peak induced by the interferometric reflector. The simulated reflectance dip 907 in FIG. 9B is at a different wavelength than the measured reflectance dip in FIG. 9C due to configuration differences of the interferometric modulator.

Figure 9D:
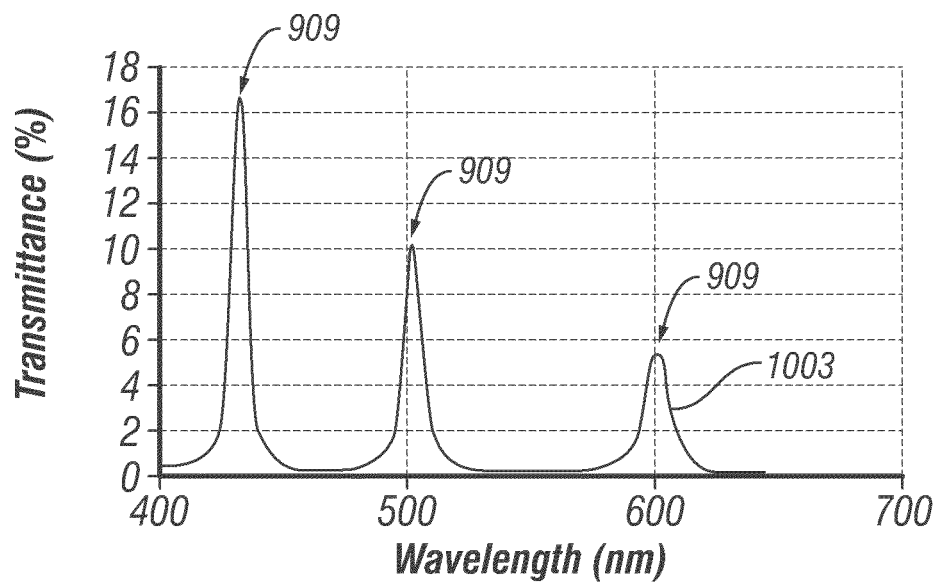
FIG. 9D shows transmittance versus wavelength through an interferometric reflector configured as shown in FIG. 9A.

FIG. 9D illustrates a light transmittance curve 1003 for light passing through an interferometric reflector of a certain configuration. In this example, the interferometric reflector has a first reflective layer formed of aluminum having a thickness of about 30 Å, an optical resonant layer formed of SiON having a thickness of about 1300 Å, and a second reflective layer formed of aluminum having a thickness of about 30 Å. Interferometric reflectors can be configured to induce multiple orders of transmission peaks 909 depending on the thickness of the optical resonant layer. Interferometric reflectors with thicker optical resonant layers will induce more orders of transmission peaks 909 than interferometric reflectors with thinner optical resonant layers. As discussed below, in addition to tuning the order of peaks 909, the thickness of the optical resonant layer can also be changed to tune the corresponding wavelengths of the peaks.

Figure 10A:
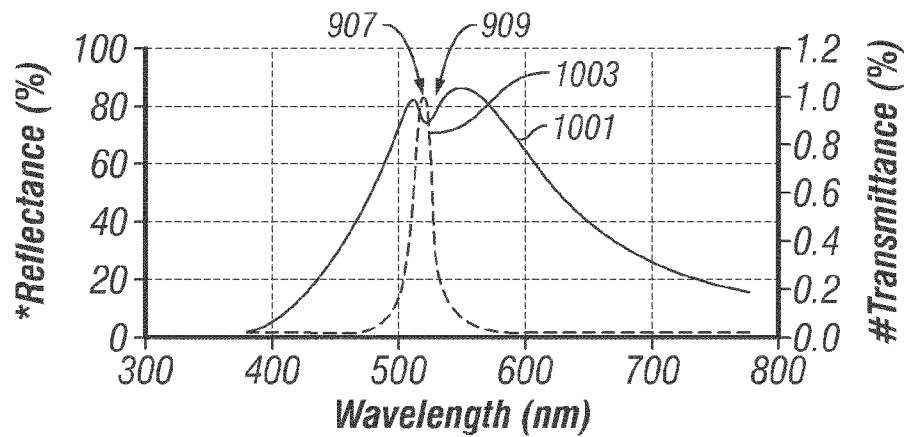
FIG. 10A shows reflection versus wavelength from the front (substrate) side of an alternative embodiment of an interferometric modulator and transmittance versus wavelength through an interferometric reflector included in the interferometric modulator.

FIG. 10A is a diagram illustrating a light reflectance curve 1001 for light reflecting from the substrate side of an interferometric modulator which includes an interferometric reflector. FIG. 10A also illustrates a light transmittance curve 1003 for light propagating through both the interferometric modulator and the interferometric reflector. In this example, the interferometric modulator associated with FIG. 10A includes an absorber layer that is about 50 Å thick and an optical resonant cavity that is about 2440 Å thick. The interferometric reflector includes a first reflective layer formed of aluminum having a thickness of about 30 Å, an optical resonant layer formed of SiON having a thickness of about 1300 Å, and a second reflective layer formed of aluminum having a thickness of about 30 Å. The light reflectance curve 1001 includes a dip 907 at a wavelength of about 520 nm. The light transmittance curve 1003 includes a peak 909 at a wavelength of about 520 nm. The transmittance peak 909 results in a transmittance of about 1% of light incident on the interferometric modulator through the interferometric reflector. This light is lost because it is not reflected back towards a viewer, but such light loss does not significantly reduce the overall reflectance of the device.

Figure 10B:
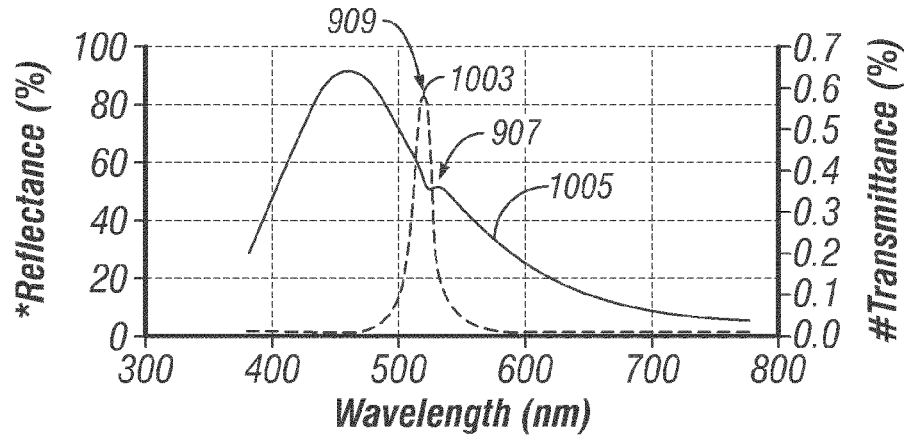
FIG. 10B shows reflection versus wavelength from the front (substrate) side of an alternative embodiment of an interferometric modulator and transmittance versus wavelength through an interferometric reflector included in the interferometric modulator.

The transmittance peak 909 and the reflectance dip 907 are generally aligned along the same wavelength because the transmittance of light through the interferometric reflector reduces the overall reflectance from the interferometric modulator. However, the position of the transmittance peak 909 is unaffected by the position of the reflectance 1001 spectrum. In other words, the reflectance curve 1001 can be adjusted by changing the thickness of the optical resonant cavity in the interferometric modulator but the transmittance peak 907, which is due to the configuration of the interferometric reflector, will stay in the same position. FIG. 10B illustrates a light reflectance curve 1005 for light reflecting from the substrate side of an interferometric modulator identical to the interferometric modulator used to create FIG. 10A except that the optical resonant cavity is reduced in FIG. 10B. FIG. 10B also illustrates a light transmittance curve 1003 for light propagating through the interferometric reflector. As mentioned above, the reflectance of light from an interferometric modulator can be adjusted or tuned by varying the thickness of the optical resonant cavity. As seen in FIG. 10B, reducing the thickness of the optical resonant cavity layer changes the reflectance curve 1005 from the reflectance shown in FIG. 10A. However, the interferometric reflector induces a peak 909 that is substantially identical to the peak shown in FIG. 10A and the transmittance curve 1003 in FIG. 10B is substantially the same as the transmittance curve in FIG. 10A. Thus, the position of the transmittance peak 909 and corresponding reflectance dip 907 is unaltered when the optical resonant cavity is varied.

Figure 10C:
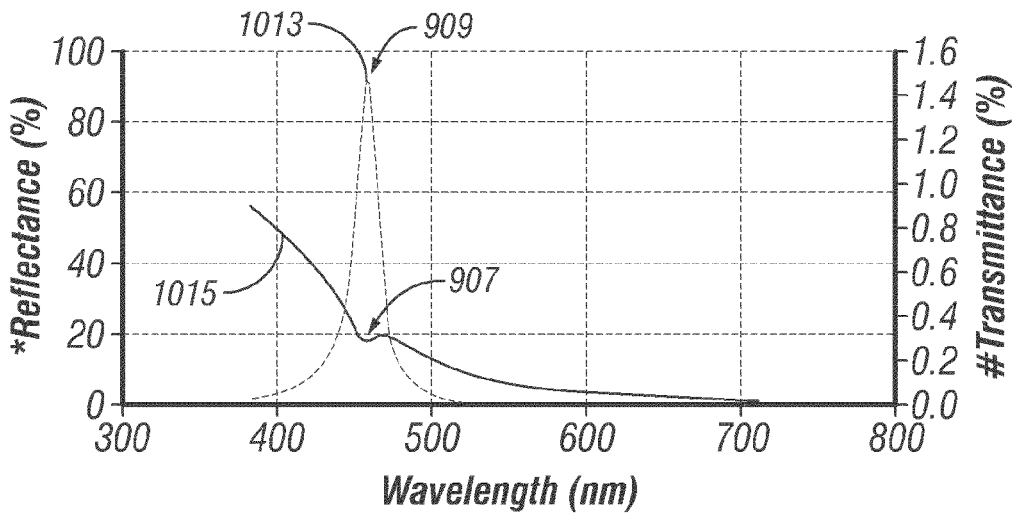
FIG. 10C shows reflection versus wavelength from the front (substrate) side of an alternative embodiment at a viewing angle of about 30° and transmittance versus wavelength through an interferometric reflector included in the interferometric modulator.

FIG. 10C illustrates a light reflectance curve 1015 for light reflecting at a viewing angle of about 30° from the substrate side of a particular interferometric modulator, for example, an interferometric modulator like the interferometric modulator used to create FIG. 10A. FIG. 10C also illustrates a light transmittance curve 1013 for light passing through the interferometric reflector. As shown in FIG. 10C, the transmittance peak 909 and corresponding reflectance dip 907 shift together with the overall reflectance spectrum when the interferometric modulator is viewed at different angles of incidence.

Figure 11A:
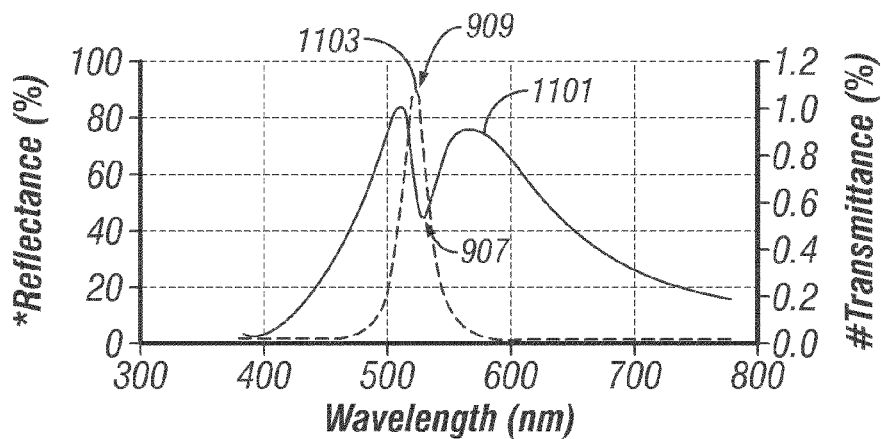
FIG. 11A shows reflection versus wavelength from the front (substrate) side of an alternative embodiment of an interferometric modulator and transmittance versus wavelength through an interferometric reflector included in the interferometric modulator.

FIG. 11A is a diagram illustrating a light reflectance curve 1101 for light reflecting from the substrate side of an interferometric modulator that includes an interferometric reflector. FIG. 11A also shows a light transmittance curve 1103 for light passing through the interferometric reflector. The interferometric modulator used to create FIG. 11A includes an absorber layer that is about 50 Å thick and an optical resonant cavity that is about 2440 Å thick. The interferometric reflector includes a first reflective layer formed of aluminum having a thickness of about 15 Å, an optical resonant layer formed of SiON having a thickness of about 1300 Å, and a second reflective layer formed of aluminum having a thickness of about 30 Å. The light reflectance curve 1101 includes a dip 907 and the light transmittance curve 1103 includes a peak 909.

Comparing FIGS. 10A and 11A illustrates the effect of the thickness of the first reflective layer on the amplitude of the dip 907. The dip 907 in FIG. 11A has a greater amplitude than the dip 907 in FIG. 10A because the first reflective layer is thicker in the interferometric reflector used to create FIG. 10A. The thickness of the first reflective layer affects the overall reflectance from the interferometric modulator, such that a thicker first reflective layer results in more light being reflected and a thinner first reflective layer results in less light being reflected from the interferometric modulator.

Figure 11B:
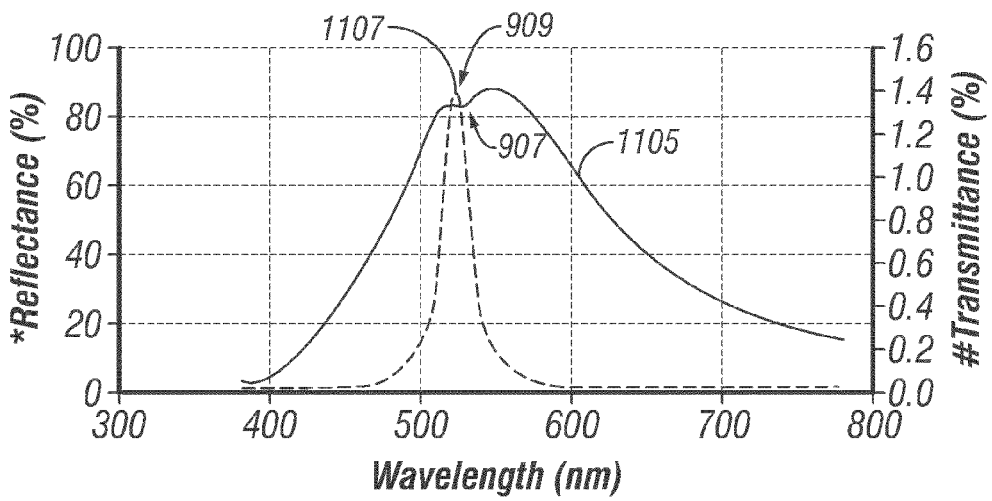
FIG. 11B shows reflection versus wavelength from the front (substrate) side of an alternative embodiment of an interferometric modulator and transmittance versus wavelength through an interferometric reflector included in the interferometric modulator.

Similarly, the thickness of the second reflective layer affects the overall transmittance through the interferometric modulator and interferometric reflector. FIG. 11B is a diagram illustrating a light reflectance curve 1105 for light reflecting from the substrate side of a particular interferometric modulator which includes an interferometric reflector. FIG. 11B also illustrates a light transmittance curve 1107 for light passing through the interferometric reflector. The interferometric modulator associated with FIG. 11B includes an absorber layer that is about 50 Å thick and an optical resonant cavity that is about 2440 Å thick. The interferometric reflector includes a first reflective layer formed of aluminum having a thickness of about 30 Å, an optical resonant layer formed of SiON having a thickness of about 1300 Å, and a second reflective layer formed of aluminum having a thickness of about 15 Å. The light reflectance curve 1105 includes a dip 907 in the reflected light spectrum and the light transmittance curve 1107 includes a peak 909.

Comparing FIGS. 10A and 11B illustrates the effect of the thickness of the second reflective layer on the amplitude of the peak 909. The peak 909 in FIG. 11B has a greater amplitude than the peak 909 in FIG. 10A because the second reflective layer is thicker in the interferometric reflector used to create FIG. 10A. The thickness of the second reflective layer affects the overall transmittance from the interferometric modulator with a thicker second reflective layer resulting in less light being transmitted and a thinner second reflective layer resulting in more light being transmitted. Accordingly, the thicknesses of the reflective layers in the interferometric reflector can be adjusted to tune the overall reflectance from the interferometric modulator and the transmittance through the interferometric reflector.

Figure 12A:
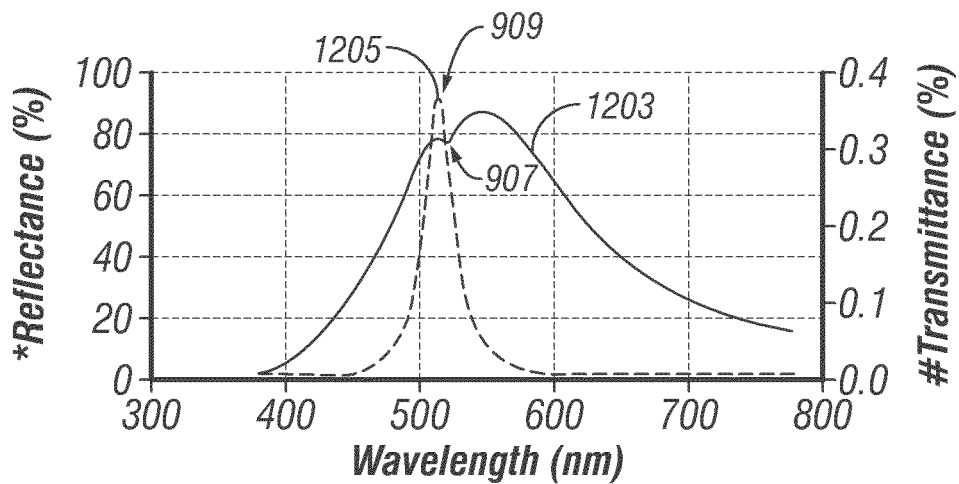
FIG. 12A shows reflection versus wavelength from the front (substrate) side of an alternative embodiment of an interferometric modulator and transmittance versus wavelength through an interferometric reflector included in the interferometric modulator.

FIG. 12A is a diagram illustrating a light reflectance curve 1203 for light reflecting from the substrate side of an interferometric modulator which includes an interferometric reflector. FIG. 12A also illustrates a light transmittance curve 1205 for light passing through the interferometric reflector. In this example, the interferometric modulator used to create FIG. 12A includes an absorber layer that is about 50 Å thick and an optical resonant cavity that is about 2440 Å thick. The interferometric reflector includes a first reflective layer formed of aluminum having a thickness of about 270 Å, an optical resonant layer formed of SiON having a thickness of about 1300 Å, and a second reflective layer formed of aluminum having a thickness of about 300 Å. The light reflectance curve 1203 includes a dip 907 in the reflectance and the light transmittance curve 1205 includes a peak 909. In this example, the dip 907 and the peak 909 are substantially aligned along a wavelength of about 520 nm and the overall amplitude of the peak 909 is about 0.4%.

Figure 12B:
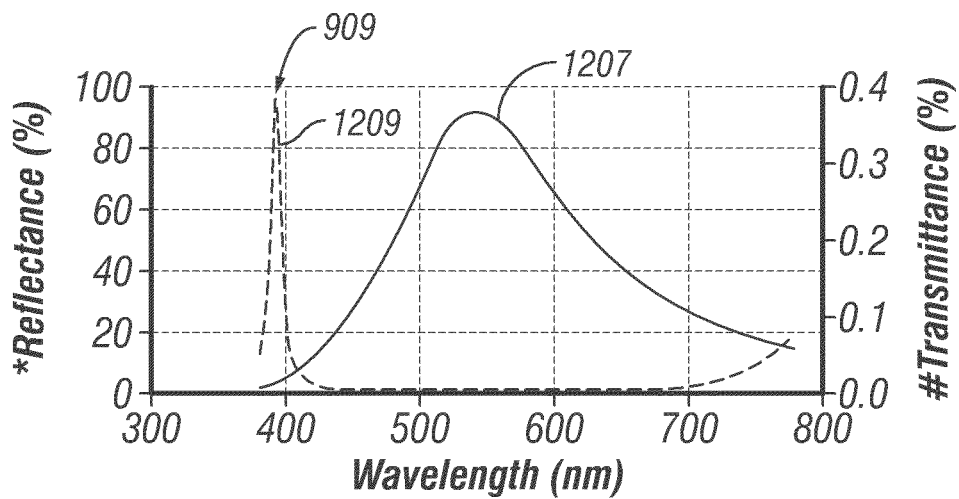
FIG. 12B shows reflection versus wavelength from the front (substrate) side of an alternative embodiment of an interferometric modulator and transmittance versus wavelength through an interferometric reflector included in the interferometric modulator.

FIG. 12B is a diagram illustrating a light reflectance curve 1207 for light reflecting from the substrate side of an interferometric modulator including an interferometric reflector. FIG. 12B also illustrates a light transmittance curve 1209 for light passing through the interferometric reflector. In this example, the interferometric modulator includes an absorber layer that is about 50 Å thick and an optical resonant cavity that is about 2440 Å thick. The interferometric reflector includes a first reflective layer formed of aluminum having a thickness of about 270 Å, an optical resonant layer formed of SiON having a thickness of about 2100 Å, and a second reflective layer formed of aluminum having a thickness of about 300 Å. The light transmittance curve 1209 includes a peak 909 that is aligned along a wavelength of about 390 nm. The peak 909 also induces a dip in the light reflectance curve 1207 at a wavelength of about 390 nm. However, the dip in reflectance 1207 is not significant because the reflectance at a wavelength of about 390 nm is under 5%.

Comparing FIGS. 12A and 12B illustrates the effect of the thickness of the optical resonant layer on the position of the peak 909. As mentioned above, the position of the peak and/or the order of the peak can be tuned by adjusting the thickness of the optical resonant layer in the interferometric reflector. Thus, the thickness of the optical resonant layer can be selected in order to increase the overall gamut of an interferometric display comprising several separate interferometric modulators.

Figure 13A:
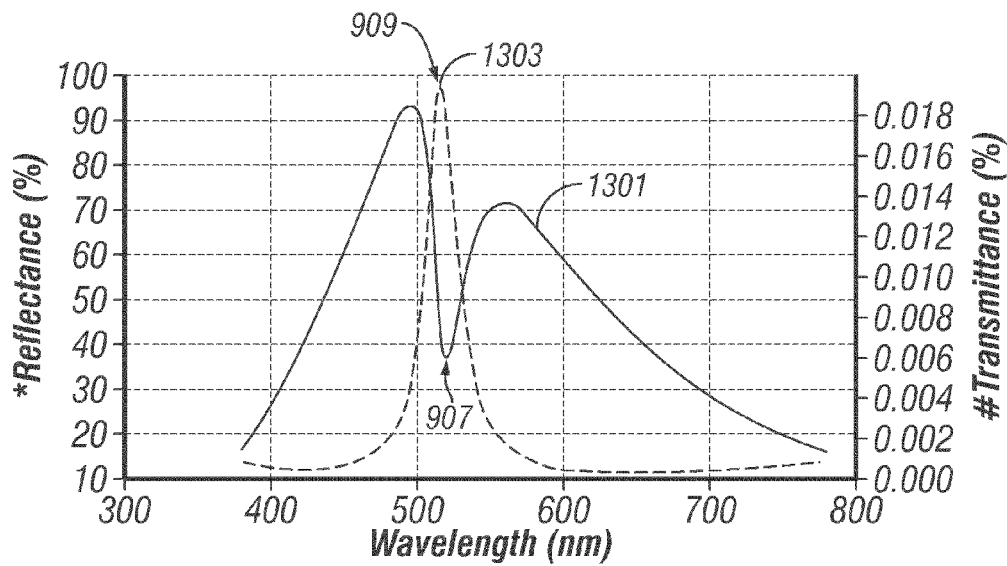
FIG. 13A shows reflection versus wavelength from the front (substrate) side of an alternative embodiment of an interferometric modulator having a molybdenum chromium absorber layer and an interferometric reflector in a relaxed position and transmittance versus wavelength through the interferometric reflector.

FIG. 13A is a diagram illustrating a light reflectance curve 1301 for light reflecting from the substrate side of one embodiment of an interferometric modulator that includes an interferometric reflector in the open (or relaxed) position. FIG. 13A also illustrates a light transmittance curve 1303 for light passing through the interferometric reflector. This interferometric modulator includes a MoCr absorber layer that is about 40 Å thick and an optical resonant cavity that is about 1940 Å thick. The interferometric reflector includes an aluminum first reflective surface having a thickness of about 120 Å, a SiON optical resonant layer having a thickness of about 2840 Å, and second reflective surface formed of aluminum having a thickness of about 600 Å. The light transmittance curve 1303 includes a peak 909 that is aligned along a wavelength of about 520 nm and induces a dip 907 in light reflectance curve 1301 at about the same wavelength.

In addition to increasing the gamut of color reflected from an interferometric display, an interferometric reflector can be used to change the color reflected from an individual interferometric modulator. As shown in Table 1 below, the interferometric modulator used to create FIG. 13A appears white when the interferometric reflector is in the relaxed position because the interferometric reflector induces a reflectance dip 907 sufficient to change the color reflected. That is to say, replacing the interferometric reflector used in the interferometric modulator with a standard reflector would result in a different color being reflected instead of white because the standard reflector would not selectively reflect and transmit certain wavelengths.

TABLE 1

|  | x Color Point | y Color Point |
|---|---|---|
| White | 0.3127 | 0.3291 |
| Interferometric Modulator With Interferometric Reflector In Open Position | 0.2973 | 0.3327 |

Figure 13B:
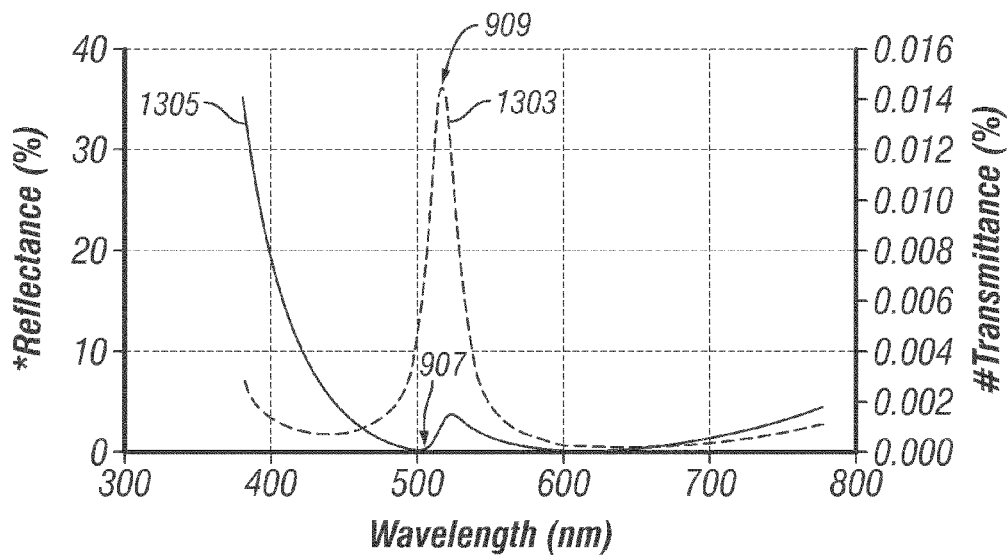
FIG. 13B shows reflection versus wavelength from the front (substrate) side of an alternative embodiment of an interferometric modulator having an interferometric reflector in an actuated position and transmittance versus wavelength through the interferometric reflector.

FIG. 13B is a diagram illustrating a light reflectance curve 1305 for light reflecting from the substrate side of the interferometric modulator used to create FIG. 13A with the interferometric reflector in the actuated position. Actuating the interferometric reflector or moving it toward the absorber layer lowers the overall reflectance 1305 from the interferometric modulator. The interferometric modulator appears dark because there is very little visible light 1305 reflected. Comparing FIGS. 13A and 13B, much more light is reflected in FIG. 13A than FIG. 13B, resulting in a good contrast ratio between the interferometric reflector in the actuated position and the interferometric reflector in the open (or relaxed position). The reflectance curve 1305 includes a dip 907 that is generally aligned with a transmittance peak 909 that induces the dip 907. Table 2 below shows the color points for the color reflected from the interferometric modulator in FIG. 13B.

TABLE 2

|  | x Color Point | y Color Point |
|---|---|---|
| Interferometric Modulator With Interferometric Reflector In Actuated Position | 0.1881 | 0.1810 |

Figure 14A:
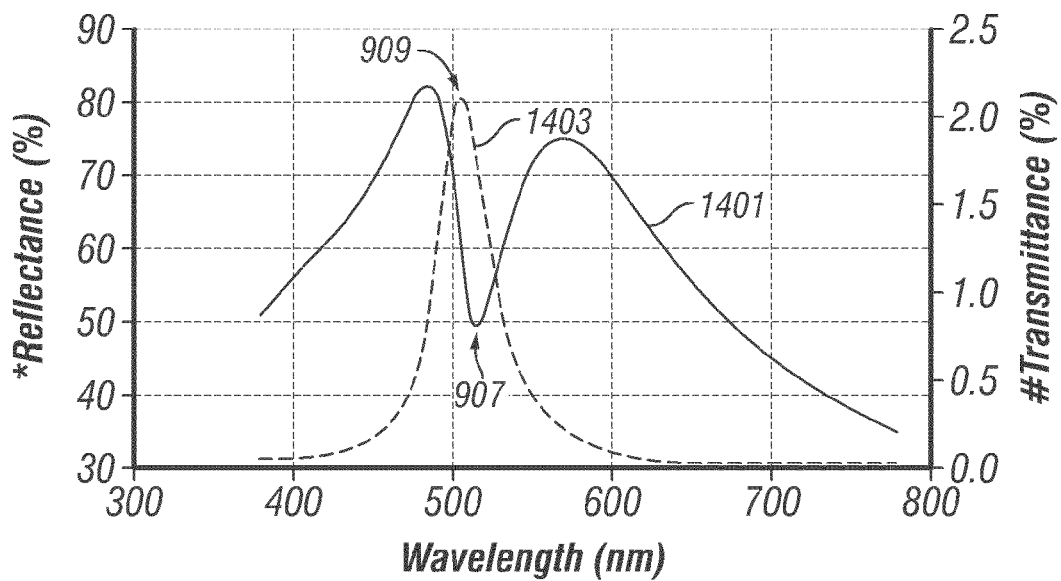
FIG. 14A shows reflection versus wavelength from the front (substrate) side of an interferometric modulator having a lead sulfide absorber layer and an interferometric reflector in a relaxed position, and transmittance versus wavelength through the interferometric reflector.

As discussed above, the light transmittance curve 1303 is not affected by actuating the reflector and changing the thickness of the optical resonant cavity but the reflectance curve 1305 is affected by tuning the interferometric reflector, absorber, and/or optical resonant cavity. FIG. 14A is a diagram illustrating a light reflectance curve 1401 for light reflected from the substrate side of an interferometric modulator including an interferometric reflector in the open (or relaxed position). FIG. 14A also illustrates a light transmittance curve 1403 for light passing through the interferometric reflector. The interferometric modulator includes a PbSe absorber layer that is about 40 Å thick and an optical resonant cavity layer that is about 1940 Å thick. The interferometric reflector is identical to the interferometric reflector used to create FIG. 13A. The transmittance curve 1403 includes a peak 909 that is aligned along a wavelength of about 520 nm and induces a dip 907 in the reflectance curve 1401 at about the same wavelength.

Comparing FIG. 13A to FIG. 14A illustrates that changing the absorber layer material does not affect transmittance of light through the interferometric reflector. However, changing the absorber material does affect the reflectance of light from the interferometric modulator. Thus, the absorber, optical resonant cavity, and interferometric reflector may all be tuned to change the overall color reflected from the interferometric modulator. Table 3 below shows the color points for color reflected from the interferometric modulator used to create FIG. 14A when the interferometric modulator is in the open position. The color reflected from the interferometric modulator in FIG. 14A is closer to white than the color reflected from the interferometric modulator in FIG. 13A.

TABLE 3

|  | x Color Point | y Color Point |
|---|---|---|
| White | 0.3127 | 0.3291 |
| Interferometric Modulator With Interferometric Reflector In Open Position | 0.3110 | 0.3234 |

Figure 14B:
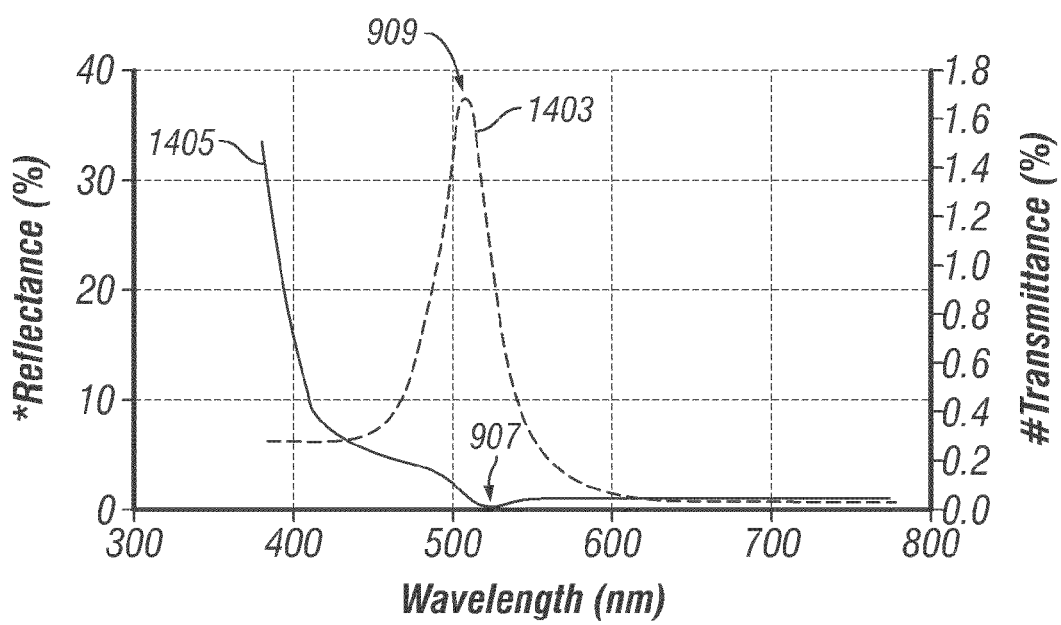
FIG. 14B shows reflection versus wavelength from the front (substrate) side of an alternative embodiment of an interferometric modulator having an interferometric reflector in an actuated position, and transmittance versus wavelength through the interferometric reflector.

FIG. 14B is a diagram illustrating a light reflectance curve 1405 for light reflecting from the substrate side of the interferometric modulator used to create FIG. 14A with the interferometric reflector in the actuated position. Actuating the interferometric reflector lowers the overall reflectance 1405 from the interferometric modulator and makes the interferometric modulator appear dark due to the contrast in light reflected between the actuated position and relaxed position. Table 4 below shows the color points for the color reflected from the interferometric modulator in FIG. 14B.

TABLE 4

|  | x Color Point | y Color Point |
|---|---|---|
| Interferometric Modulator With Interferometric Reflector In Actuated Position | 0.2011 | 0.1222 |

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An interferometric modulator device comprising:
   an absorber layer;
   an interferometric reflector configured to move in a direction generally perpendicular to the absorber layer through a variable air gap located at least partially between the absorber layer and the interferometric reflector, the interferometric reflector including:
      a first partially reflective and partially transmissive layer,
      a second partially reflective and partially reflective layer fixed relative to the first partially reflective and partially transmissive layer, and
      a first interferometric cavity disposed between the first partially reflective and partially transmissive layer and the second partially reflective and partially reflective layer,
   wherein the interferometric reflector is configured to transmit a certain spectrum of light at a transmission peak wavelength such that the interferometric modulator device has a diminished reflectance of light at the transmission peak wavelength; and
   a second interferometric cavity disposed between the absorber layer and the interferometric reflector.

2. The interferometric modulator device of claim 1, wherein the first interferometric cavity includes a transparent dielectric.

3. The interferometric modulator device of claim 1, wherein the interferometric reflector is tuned to transmit a certain spectrum of light at a transmission peak wavelength within a visible range of light.

4. The interferometric modulator device of claim 1, wherein the interferometric reflector is tuned to transmit more than one spectrum of light at more than one transmission peak wavelength between about 380 nm and about 750 nm.

5. The interferometric modulator device of claim 1, wherein the absorber layer includes a material selected from a group consisting of molybdenum, titanium, tungsten, chromium, molybdenum chromium, lead selenide, and combinations thereof.

6. The interferometric modulator device of claim 1, wherein the first reflective layer includes a material selected from a group consisting of aluminum, gold, silver, molybdenum, chromium, copper, nickel, and combinations thereof.

7. The interferometric modulator device of claim 6, wherein the first partially reflective and partially transmissive layer and the second partially reflective and partially transmissive layer include the same material.

8. The interferometric modulator device of claim 1, wherein the first partially reflective and partially transmissive layer has a thickness between about 1 nm and about 50 nm.

9. The interferometric modulator device of claim 1, wherein the second partially reflective and partially transmissive layer has a thickness between about 5 nm and about 200 nm.

10. The interferometric modulator device of claim 1, wherein the first interferometric cavity has a thickness between about 200 nm and about 3000 nm.

11. The interferometric modulator device of claim 1, further comprising:
    a display;
    a processor that is configured to communicate with the display, the processor being configured to process image data; and
    a memory device that is configured to communicate with the processor.

12. The interferometric modulator device of claim 11, further comprising a driver circuit configured to send at least one signal to the display.

13. The interferometric modulator device of claim 12, further comprising a controller configured to send at least a portion of the image data to the driver circuit.

14. The interferometric modulator device of claim 11, further comprising an image source module configured to send the image data to the processor.

15. The interferometric modulator device of claim 14 wherein the image source module includes at least one of a receiver, transceiver, and transmitter.

16. The interferometric modulator device of claim 11, further comprising an input device configured to receive input data and to communicate the input data to the processor.

17. An interferometric modulator device comprising:
    means for at least partially absorbing light;
    means for reflecting light, the reflecting means configured to move in a direction generally perpendicular to the absorbing means through a variable air gap located at least partially between the absorbing means and the reflecting means, the reflecting means including:
       first means for partially reflecting and partially transmitting light,
       second means for partially reflecting and partially transmitting light, the second partially reflective and partially transmissive means fixed relative to the first partially reflective and partially transmissive means, and
       a first interferometric cavity disposed between the first partially reflective and partially transmissive means and the second partially reflective and partially transmissive means,
    wherein the reflecting means is configured to transmit a certain spectrum of light at a transmission peak wavelength such that the interferometric modulator device has a diminished reflectance of light at the transmission peak wavelength; and
    a second interferometric cavity disposed between the absorbing means and the reflecting means.

18. The interferometric modulator device of claim 17, wherein the absorbing means includes an absorber layer.

19. The interferometric modulator device of claim 17, wherein the first partially reflective and partially transmissive means includes a first partially reflective and partially transmissive layer.

20. The interferometric modulator device of claim 17, wherein the second partially reflective and partially transmissive means includes a second partially reflective and partially transmissive layer.

21. A method of manufacturing an interferometric modulator device, the method comprising:
providing an absorber layer;
providing an interferometric reflector, the interferometric reflector being configured to move in a direction generally perpendicular to the absorber layer and including:
a first partially reflective and partially transmissive layer,
a second partially reflective and partially reflective layer fixed relative to the first partially reflective and partially transmissive layer, and
a first interferometric cavity disposed between the first partially reflective and partially transmissive layer and the second partially reflective and partially reflective layer,
wherein the interferometric reflector is configured to transmit a certain, spectrum of light at a transmission peak wavelength such that the interferometric modulator device has a diminished reflectance at the transmission peak wavelength; and
positioning the interferometric reflector relative to the absorber layer to create a second interferometric cavity between at least a portion of the interferometric reflector and at least a portion of the absorber layer.

22. An interferometric modulator comprising an interferometric reflector, an absorber layer, and a first interferometric cavity defined between the absorber layer and the interferometric reflector, wherein the interferometric reflector is configured to move in a direction generally perpendicular to the absorber layer wherein the interferometric reflector includes: a first reflective surface; a second reflective surface; and a second interferometric cavity defined by the first reflective surface and the second reflective surface.

23. The interferometric modulator of claim 22, wherein the first reflective surface is partially reflective.

24. The interferometric modulator of claim 22, wherein the second reflective surface is partially reflective.

25. The interferometric modulator of claim 22, wherein the first reflective surface and the second reflective surface are fixed relative to each other.

26. The interferometric modulator of claim 22, wherein the first reflective surface includes a material selected from a group consisting of aluminum, gold, silver, molybdenum, chromium, copper, nickel, and combinations thereof.

27. The interferometric modulator of claim 22, wherein the second reflective surface includes a material selected from a group consisting of aluminum, gold, silver, molybdenum, chromium, copper, nickel, and combinations thereof.

28. The interferometric modulator of claim 22, wherein the first reflective surface and the second reflective surface each have a thickness, the thickness of the first reflective surface being about the same as the thickness of the second reflective surface.

29. The interferometric modulator of claim 22, wherein the second interferometric cavity includes air.

30. The interferometric modulator of claim 22, wherein the second interferometric cavity includes a generally transparent dielectric.

31. The interferometric modulator of claim 30, wherein the second interferometric cavity includes silicon oxy-nitride (SiON).

32. The interferometric modulator of claim 22, wherein the interferometric reflector is configured to transmit a certain spectrum of light at a transmission peak wavelength such that the interferometric modulator has a diminished reflectance of light at the transmission peak wavelength.

33. The interferometric modulator of claim 32, wherein the transmission peak wavelength is between about 380 nm and about 750 nm.

34. The interferometric modulator of claim 32, wherein the amount of light transmitted by the interferometric reflector is less than about 5% of the reflectance of the interferometric modulator.

35. The interferometric modulator of claim 22, wherein the interferometric reflector is configured to move between at least two positions.

36. The interferometric modulator of claim 22, wherein the first interferometric cavity includes air.

37. The interferometric modulator of claim 22, wherein the first interferometric cavity includes a generally transparent dielectric.

38. The interferometric modulator of claim 37, wherein the first interferometric cavity includes silicon oxy-nitride.

39. The interferometric modulator of claim 22, wherein the absorber layer includes a material selected from a group consisting of molybdenum, titanium, tungsten, chromium, molybdenum chromium, lead selenide, and combinations thereof.

40. The interferometric modulator of claim 22, further comprising a substrate layer disposed such that the absorber layer is between the substrate layer and the interferometric reflector.

41. The interferometric modulator of claim 40, wherein the substrate layer includes glass.

* * * * *

UNITED STATES PATENT AND TRADEMARK OFFICE
CERTIFICATE OF CORRECTION

PATENT NO.       : 8,488,228 B2
APPLICATION NO.  : 12/568472
DATED            : July 16, 2013
INVENTOR(S)      : Mienko et al.

It is certified that error appears in the above-identified patent and that said Letters Patent is hereby corrected as shown below:

On the Title page
  In column 2 (page 4 item 56) at line 52, Under Other Publications, change "IEEEE" to --IEEE--.

In the Specification
  In column 8 at line 59, change "respectively" to --respectively.--.
  In column 10 at line 16, change "ore" to --or--.
  In column 15 at line 38, change "and/0r" to --and/or--.

In the Claims
  In column 21 at line 38, In Claim 1, change "second partially reflective and partially reflective layer" to --second partially reflective and partially transmissive layer"--.
  In column 21 at lines 43-44, In Claim 1, change "second partially reflective and partially reflective layer" to --second partially reflective and partially transmissive layer"--.
  In column 23 at line 19, In Claim 21, change "second partially reflective and partially reflective layer" to --second partially reflective and partially transmissive layer"--.
  In column 23 at lines 25-26, In Claim 21, change "second partially reflective and partially reflective layer" to --second partially reflective and partially transmissive layer"--.
  In column 23 at line 28, In Claim 21, change "certain," to --certain--.
  In column 23 at line 41, In Claim 22, change "layer" to --layer,--.

Signed and Sealed this
Twentieth Day of May, 2014

Michelle K. Lee
*Deputy Director of the United States Patent and Trademark Office*